(12) United States Patent
Bertin et al.

(10) Patent No.: US 9,108,843 B2
(45) Date of Patent: Aug. 18, 2015

(54) METHOD AND SYSTEM FOR PREPARATION OF HIGHLY POROUS AND PREFERENTIALLY-ORIENTED {100} PLATINUM NANOWIRES AND THIN FILMS

(75) Inventors: Erwan Bertin, St-Amable (CA); Sébastien Garbarino, Montréal (CA); Daniel Guay, St-Lambert (CA); Manuel Martin, Montréal (CA); Alexandre Ponrouch, Montpellier (FR)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 675 days.

(21) Appl. No.: 13/421,706

(22) Filed: Mar. 15, 2012

(65) Prior Publication Data
US 2012/0234686 A1 Sep. 20, 2012

Related U.S. Application Data

(60) Provisional application No. 61/452,837, filed on Mar. 15, 2011.

(51) Int. Cl.
*B82Y 40/00* (2011.01)
*C25D 5/00* (2006.01)
*C25D 3/50* (2006.01)
*B82Y 30/00* (2011.01)
*C25D 5/16* (2006.01)

(52) U.S. Cl.
CPC ............... *B82Y 30/00* (2013.01); *B82Y 40/00* (2013.01); *C25D 3/50* (2013.01); *C25D 5/16* (2013.01)

(58) Field of Classification Search
CPC .......... B82Y 30/00; B82Y 40/00; C25D 3/50; C25D 3/52; C25B 11/0473
USPC ........... 205/112, 264, 261, 238; 977/781, 902
See application file for complete search history.

(56) References Cited

PUBLICATIONS

Jo et al., "Field-emission studies on thin films of zinc oxide nanowires" Applied Physics Letters vol. 83, No. 23, p. 4821-4823, (2003).*
S. Gabarino et al. Synthesis and characterization of preferentially oriented (100) Pt nanowires, Electrochemistry Communications 11, 2009, pp. 1924-1927.
P. Rodriguez et al. Specific surface reactions for identification of platinum surface domains surface characterization . . . , Electrochimica Acta 50 (2005), pp. 4308-4317.

(Continued)

*Primary Examiner* — James Lin
*Assistant Examiner* — Leo Ahnn

(57) ABSTRACT

A method for preparation of highly porous and preferentially-oriented {100} platinum on a substrate by electrodeposition in a deposition bath, comprising using a deposition potential $E_{dep}$ lower than $E_{RHE}$+150 mV and an acidified platinum salt solution having a Pt salt concentration less than 5.0 mmole $L^{-1}$ or, in presence of hydrogen, comprising limiting the concentration of Pt salts in the electrolyte to less than 5.0 mmole $L^{-1}$ and controlling the temperature of the electrolyte. Preferentially-oriented {100} platinum nanowires and thin films, comprising Pt{100} in a range between about 20 and about 60% and having a roughness factor of at least 50 are produced.

24 Claims, 30 Drawing Sheets

(56) References Cited

PUBLICATIONS

V. Rosca et al. Electrocatalytic oxidation of hydrazine on platinum electrodes in alkaline solutions, Electrochimica Acta 53 (2008), pp. 5199-5205.

T.S. Ahmadi et al. Shape-Controlled synthesis of Colloidal Platinum Nanoparticles, Science, vol. 272, pp. 1924-1926.

N. V. Rees et al. Carbon-Free energy: a review of ammonia-and hydrazine-based electrochemical fuel cells, Energy Environ. Sci. 2011, pp. 1255-1260.

N. Tian et al. Direct electrodeposition of tetrahexahedral Pd Nanocrystals with high-index facets and high catalytic activity . . . J. Am. Chem. Soc. 2010, 132, pp. 7580-7581.

W.E. Triaca et al. The electrochemical facetting of metal surfaces: Preferred crystallographic orientation . . . , Journal of Applied Electrochemistry 20 (1990), 347-356.

R.M. Cervino et al Electrochemical preparations and characteristics of platinum electrode surfaces . . . J. Electroanal. Chem. 182 (1985) pp. 51-60.

Nishihara et al. Behavior of hydrazine and its effects on the adsorption of hydrogen at Pt(322) . . . J. Electroanal. Chem. 338 (1992) pp. 299-316.

R. Gomez et al. The electrochemistry of nitrogen-containing compounds at platinum single crystal electrodes. J. Electroanal. Chem. 358 (1993) pp. 287-305.

S. Brimaud et al., New finds on CO electrooxidation at platinum nanoparticle surfaces, Electrochemistry Communications 10 (2008) pp. 1703-1707.

B. Alvarez-Ruiz et al., Role of the metal and surface structure in the electro-oxidation of hydrazine . . . , Journal of the Electrochemical Society, 149 (3) D35-D45 (2002).

A. Ponrouch et al., Electrodeposition of arrays of Ru, Pt, and PtRu Alloy 1D Metallic Nanostructures, Journal of Electrochemical Society, 157 (3) K59-K65 (2010).

F.J. Vidal-Iglesias et al. Ammonia Selective Oxidation on Pt(100) sites in an alkaline medium, J. Phys. Chem. B 2005, 109, 12914-12919.

L.Y. Zhao et al., Electrochemical deposition of chromium core-shell nanostructures on H-Si (100): evolution . . . , The Journal of Physical Chemistry Letters 2007, 111, 14621-14624.

F.J. Vidal-Iglesias et al., Screening of electrocatalysts for direct ammonia fuel cell: Ammonia oxidation on PtMe . . . Journal of Power Sources 171 (2007) pp. 448-456.

F.J. Vidal-Iglesias et al., Selective electrocatalysis of ammonia oxidation on Pt(100) sites in alkaline medium, Electrochemistry Communication 5 (2003), pp. 22-26.

J. Gomez et al., Surface topography of (100)-type electro-faceted platinum from scanning tunneliing microscopy . . . , Nature vol. 323, Oct. 16, 1986, pp. 612-614.

P.L. Taberna et al., High rate capabilities Fe3O4-based Cu nano-architectured electrodes for lithium-ion battery applications, Nature Materials, vol. 5, Jul. 2006, pp. 567-573.

V. Rosca et al., Electrocatalytic oxidation of ammonia on Pt(111) and Pt(100) surfaces, Physical Chemistry Chemical Physics, 2006, 8, pp. 2513-2524.

J. Solla-Gullon et al., Electrochemical characterisation of platinum nanoparticles prepared by microemulsion . . . , Journal of Electroanalytical Chemistry 491 (2000), pp. 69-77.

J. Solla-Gullen et al., Surface characterization of platinum electrodes, Physical Chemistry Chemical Physics, 2008, 10, pp. 1359-1373.1444.

T.S. Ahmadi et al., Cubic Colloidal Platinum Nanoparticles, Chem. Mater, vol. 8, No. 6, 1996, pp. 1161-1163.

A. Ponrouch et al., Synthesis and characterization of well aligned Ru nanowires and nanotubes, ECS Transactions, 25 (41) 3-11 (2010).

P. Urchaga et al., Selective Syntheses and Electrochemical Characterizations of Platinum Nanocubes and Nanotetrahedrons/Octahedrons, Electrocatal (2010) 1:3-6.

* cited by examiner

Figure 13
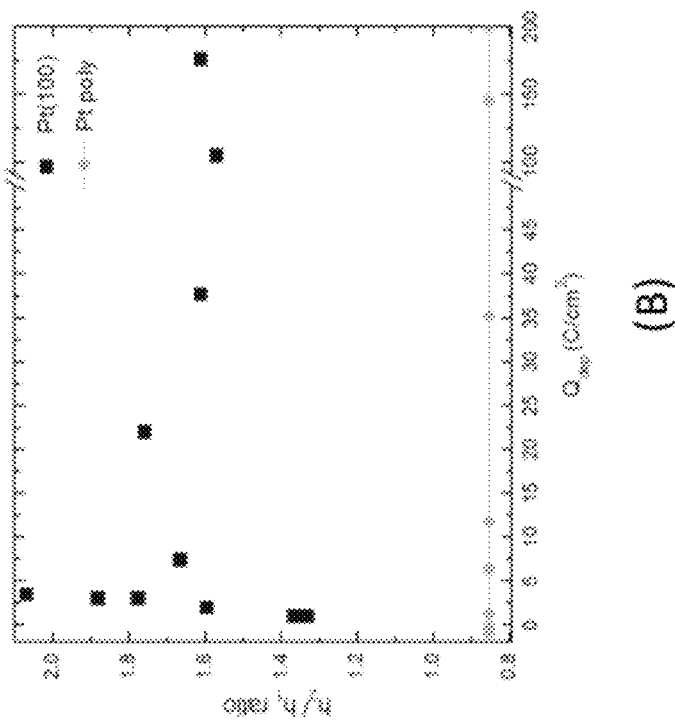
(B)
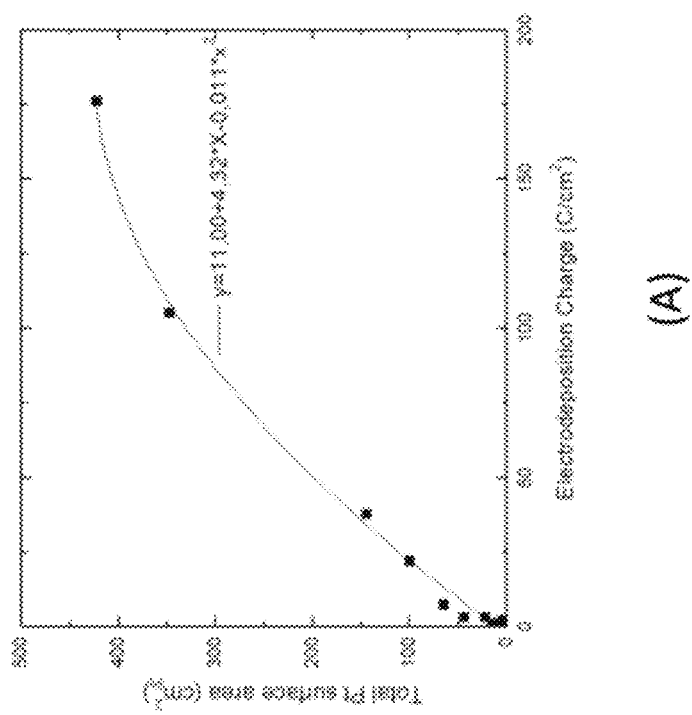
(A)

METHOD AND SYSTEM FOR PREPARATION OF HIGHLY POROUS AND PREFERENTIALLY-ORIENTED {100} PLATINUM NANOWIRES AND THIN FILMS

CROSS REFERENCE TO RELATED APPLICATIONS

This application claims benefit, under 35 U.S.C. §119(e), of U.S. provisional application Ser. No. 61/452,837, filed on Mar. 15, 2011. All documents above are incorporated herein in their entirety by reference.

FIELD OF THE INVENTION

The present invention relates to {100} platinum surfaces. More specifically, the present invention is concerned with a method and system for preparation of highly porous and preferentially-oriented {100} platinum nanowires and thin films.

BACKGROUND OF THE INVENTION

The electrochemical oxidation of ammonia and hydrazine has been studied for many years. Ammonia oxidation is important in the fabrication of electrochemical sensors for water and air analyses. In addition, ammonia is a common water pollutant in industrial wastewaters and in continental waters. Therefore, the development of an electrochemical method to convert ammonia into nitrogen would open up new possibilities in environmental electrochemistry. Likewise, hydrazine is important in numerous industrial applications, including metal plating and protection against corrosion to control concentrations of dissolved oxygen. It is also used in various rocket fuels and as a component in explosives. Hydrazine is highly toxic and its electrochemical detection is also of significant interest. Finally, the most recent developments in low-temperature fuel cell technology have shown nitrogen hydrides, ammonia, and hydrazine to be suitable candidates in the race for commercial, high-performance, portable fuel cells.

Several studies have been devoted to the electro-oxidation of ammonia and hydrazine on polycrystalline substrates. More recently, studies of ammonia and hydrazine oxidation on single-crystal metal surfaces have been reported, providing evidence that the electro-oxidation process of these small nitrogen hydride molecules is structure-sensitive. For example, in acidified solution, it was found that hydrazine adsorbs more readily on Pt (100) steps than on Pt (111) terraces. While it was shown that the basal planes of platinum and rhodium are much more active for hydrazine oxidation than the corresponding gold surfaces, it was also shown that the (100) plane was one of the most active planes of all three metals. In alkaline media, the electrocatalytic activity of basal planes increases in the order Pt(110)>Pt(100)>Pt(111). Likewise, in alkaline media, the electro-oxidation of ammonia on Pt occurs almost exclusively on surface sites with (100) symmetry.

Therefore, from a practical viewpoint, it would be highly desirable to prepare Pt electrodes that could exhibit both a high electrochemically active surface area and a preferentially-oriented {100} surface structure.

In the early 1970s, an electrochemical method was presented to obtain Pt electrode surfaces with preferred orientations from bulk polycrystalline platinum. The method is based on the use of repetitive potential sweeps at high frequency under carefully-selected potential perturbation conditions. Under the right conditions, the formation of preferentially-oriented {100} surfaces was achieved, but the roughness factor was low and does not exceed R=3. Under these conditions, while the intrinsic electrocatalytic activity (expressed as current per Pt surface atom) for the electro-oxidation of nitrogen hydrides might be high, the overall electrocatalytic activity (expressed as current per geometric surface area) will remain low as a result of the low roughness factor.

Several groups have focused on the use of preferentially-oriented {100} platinum particles to combine both a high intrinsic electrocatalytic activity and high electrochemically active surface area. These particles consist of Pt cubic nanoparticles synthesized in the form of colloidal platinum, using a capping agent (sodium polyacrylate) and hydrogen gas as a reducing agent. According to high-resolution transmission electron microscopy, these nanoparticles show flat surfaces with {100} facets, and the distances between the adjacent lattice fringes is the interplanar distance of Pt {200}. Pt nanoparticles prepared using the same method elsewhere have been shown to exhibit characteristic hydrogen adsorption/desorption peaks, CO-stripping peaks, as well as the characteristic response of irreversibly-adsorbed germanium on (100) sites of platinum. These oriented nanoparticles show higher current densities for the electro-oxidation of ammonia in alkaline media than polycrystalline Pt nanoparticles.

Colloidal methods using organic ligand stabilizers are one of the most commonly used methods to make shape-controlled particles. However, the organic ligand shells can be difficult to remove. Various methods have been devised for cleaning the nanoparticles, such as heating in different atmospheres or submitting the nanoparticle to electrochemical decontamination by surface oxidation. However, these methods could produce a change in the surface structure. It was shown that modification of the surface structure may be limited if electrochemical decontamination is performed under the right conditions, and residual surfactant molecules were still present, causing an incomplete deposition of the Pt nanoparticles (floating) on the surface of the substrate. From a more pragmatic point of view, the preparation of an electrode from an assembly of such nanoparticles is also challenging.

It was shown recently that electrodeposition might be used to prepare metallic particles of various shapes. For example, it was demonstrated that granular Cr nanoparticles or hexagonal microrods could be obtained depending on the deposition conditions, and the synthesis of tetrahexahedral Pd nanocrystals with high Miller Index facets was demonstrated using a pulse electrodeposition method. Likewise, it was shown recently that Pt nanowire with preferentially-oriented {100} surfaces could be prepared through template-assisted deposition, using an anodic aluminum oxide (AAO) membrane.

The present description refers to a number of documents, the content of which is herein incorporated by reference in their entirety.

SUMMARY OF THE INVENTION

More specifically, in accordance with the present invention, there is provided a method for preparation of highly porous and preferentially-oriented {100} platinum on a substrate by electrodeposition in a deposition bath, comprising using a deposition potential $E_{dep}$ lower than $E_{RHE}$+150 mV and an acidified platinum salt solution having a Pt salt concentration less than 5.0 mmole $L^{-1}$.

There is further provided a method for preparation of highly porous and preferentially-oriented {100} platinum on a substrate by electrodeposition in presence of hydrogen, comprising limiting the concentration of Pt salts in the electrolyte to less than 5.0 mmole L$^{-1}$ and controlling the temperature of the electrolyte.

There is further provided preferentially-oriented {100} platinum nanowires and thin films, comprising Pt{100} in a range between about 20 and about 60% and having a roughness factor of at least 50.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 13 shows the influence of the electrodeposition charge (Q$_{dep}$) on the Pt surface area properties: (A) total Pt real surface area calculated from voltammetry; (B) h$_2$/h$_1$: an in situ immediate experimental tool linearly correlated to proportion of Pt (100) surface sites;

DESCRIPTION OF ILLUSTRATIVE EMBODIMENTS

Figure 1:
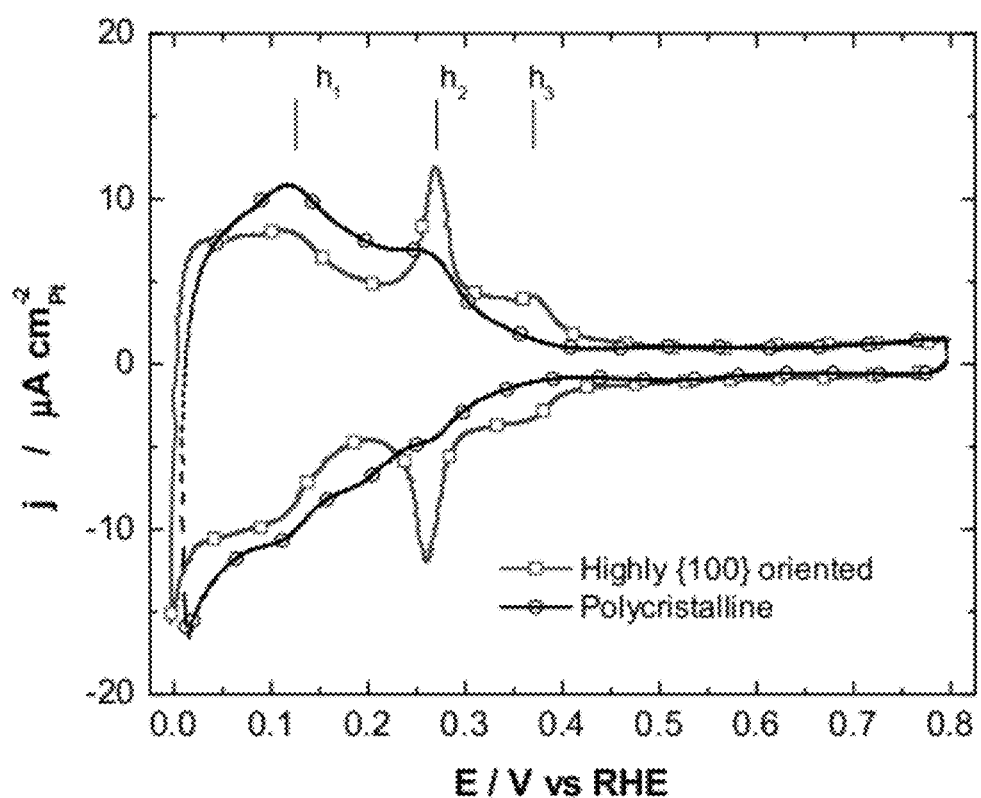
FIG. 1 shows cyclic voltammetric curves (5 mVs$^{-1}$) of polycrystalline and highly-oriented {100} Pt deposits in 0.5M H$_2$SO$_4$, with the positive limit of the scan restricted to +0.80V vs RHE.

The present invention is illustrated in further details by the following non-limiting examples.

Experimental

Pt thin films (TFs) and Pt nanowires (NWs) were electroplated on Ti substrates (1 cm$^2$) using an experimental setup for the preparation of Pt TFs and NWs described elsewhere (see P. L. Taberna, S. Mitra, P. Poizot, P. Simon, J. M. Tarascon, *Nature Mater.* 2006, 5, 567 and A. Ponrouch, M. P. Bichat, S. Garbarino, C. Maunders, G. Botton, P. L. Taberna, P. Simon, D. Guay, *ECS Transactions* 2010, 25, 3), and further described hereinbelow. The working electrode was a Ti plate while Pt gauze was used as counter electrode. A saturated calomel electrode was used as a reference electrode. A Luggin capillary was employed to minimize the iR drop. All samples were thoroughly rinsed with water after plating. Pt deposits were also performed onto carbon substrates (carbon paper, Spectracorp, 2050-A0850).

The deposits were prepared by potentiostatic electrodeposition using acidified (HCl) $Na_2PtCl_6 \cdot xH_2O$ solutions, with KCl as supporting electrolyte. The deposition potential ($E_{dep}$), the temperature of the bath during deposition ($T_{dep}$), and the $Na_2PtCl_6 \cdot xH_2O$ concentration were systematically varied. The concentrations of HCl (10 mM) and KCl (100 mM) were kept constant for all experiments.

The surface morphology of the deposits was examined by Scanning Electron Microscopy (SEM) on a JEOL JSM-6300 microscope at an accelerating voltage of 5 kV. The crystallographic structures were analyzed by X-ray diffraction (XRD) measurements on a Bruker D8 Advanced X-ray diffractometer with Cu $K_\alpha$ radiation (1.54184 Å), operating at 40 kV and 40 mA. High-resolution transmission electron microscopy (TEM) was carried out on a FEI Titan 80-300 TEM equipped with an aberration corrector for the imaging lens (CEOS). The material was scraped from the substrate and suspended in water. A drop of solution was put on a holey carbon film supported by a Cu grid and left to dry before being inserted in the TEM.

The electrochemical measurements were carried out in a three-compartment cell at room temperature with platinum gauze and a Reversible Hydrogen Electrode (RHE) or a standard calomel electrode (SCE) as auxiliary and reference electrodes, respectively. Cyclic voltammograms were recorded in de-aerated (Argon N5.0, Praxair) 0.5M ultrapure sulphuric acid (A300-212, Fisher Scientific). The electrode potential was first cycled at 50 mVs$^{-1}$ up to 0.8V until a stationary voltammetric profile was obtained. All current densities are normalized to true surface area of Pt determined from the hydrogen desorption charge. All cyclic voltammograms have been corrected for the uncompensated ohmic drop. Gold-plated crystals (9 MHz AT-cut) were used for the electrochemical quartz crystal microbalance (EQCM) experiments. The Pt deposition rates were determined as described elsewhere (see A. Ponrouch, S. Garbarino, S. Pronovost, P. L. Taberna, P. Simon, D. Guay, *J. Electrochem. Soc.* 2010, 157, K59).

Electrochemical Characterization

Cyclic voltammetric curves (CVs) of Pt electrodes prepared under different deposition parameters are shown in FIG. 1. In all cases, the upper potential limit was restricted to 0.80 V vs RHE to avoid crystallographic surface change. In the forward sweep, four main anodic peaks were observed at about 0.12 ($h_1$), 0.26 ($h_2$) and 0.37V ($h_3$) vs RHE. The anodic peaks $h_1$, $h_2$ and $h_3$ are attributed to hydrogen desorption from (110) sites, (100) step sites and (100) terrace sites respectively. As seen in FIG. 1, the maximum peak current of these various features varies with the deposition conditions.

Figure 9:
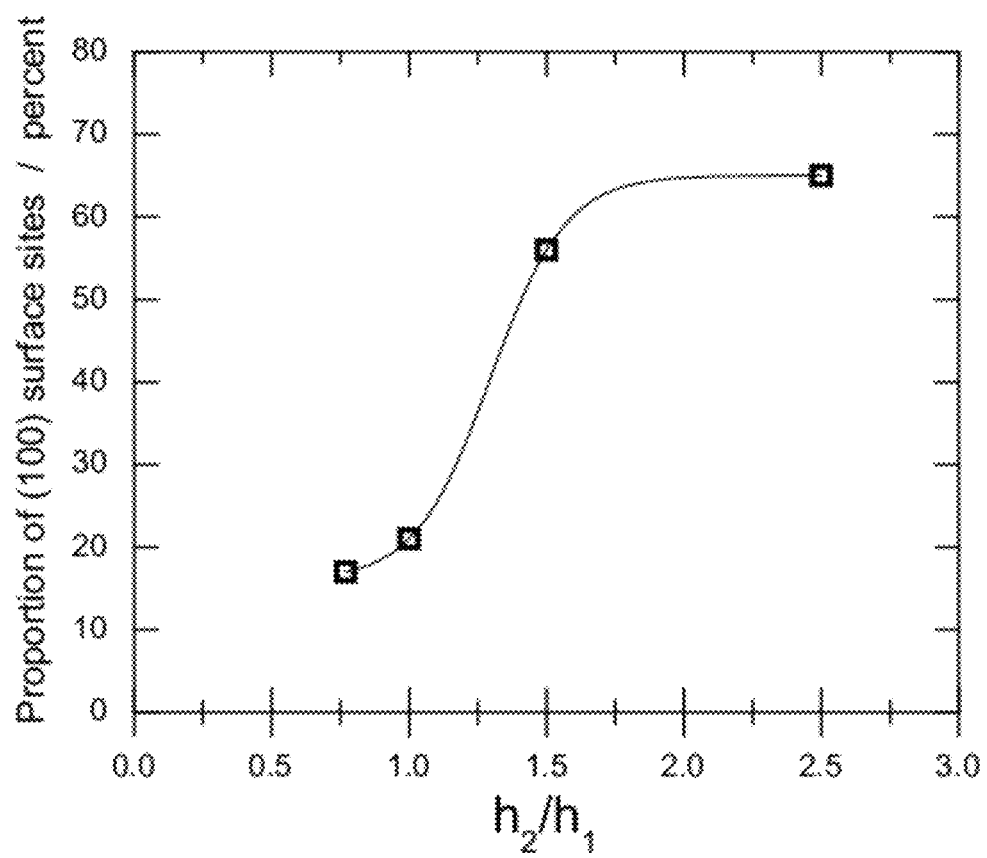
FIG. 9 shows the variation of the proportion of Pt(100) surface sites on platinum surfaces with respect to the h$_2$/h$_1$ peak current ratio. The open squares correspond to data that was extracted from FIG. 8 and Table 1 of P. Rodriguez, E. Herrero, J. Solla-Gullon, F. J. Vidal-Iglesias, A. Aldaz, J. M. Feliu, *Electrochim. Acta* 2005, 50, 4308. The line was drawn as a guide and is not supported by any model.

A comparison between the $h_2/h_1$ peak current ratio measured on their CVs and the fractions of (111) and (100) sites determined from their deconvolution of the hydrogen desorption region and site-specific adsorption of Bi is shown in FIG. 9. Based on this analysis, one can roughly estimate the amount of (100) surface sites on Pt samples from an inspection of the CVs. The $h_2/h_1$ peak current ratios observed in the two CVs in FIG. 1 are 0.6 and 1.6, which corresponds to a proportion of (100) surface sites of about 20 and 65%, respectively. In FIG. 1, it is also interesting to note the high $h_2/h_1$ peak current ratio indicative of a large proportion of (100) surface sites are also accompanied by a marked contribution at about 0.37V ($h_3$) that is attributed to wide (100) terraces. Both results are consistent and are indicative that the amount of (100) surface sites, either step sites or terraces, may be adjusted through careful selection of the deposition conditions.

Figure 2:
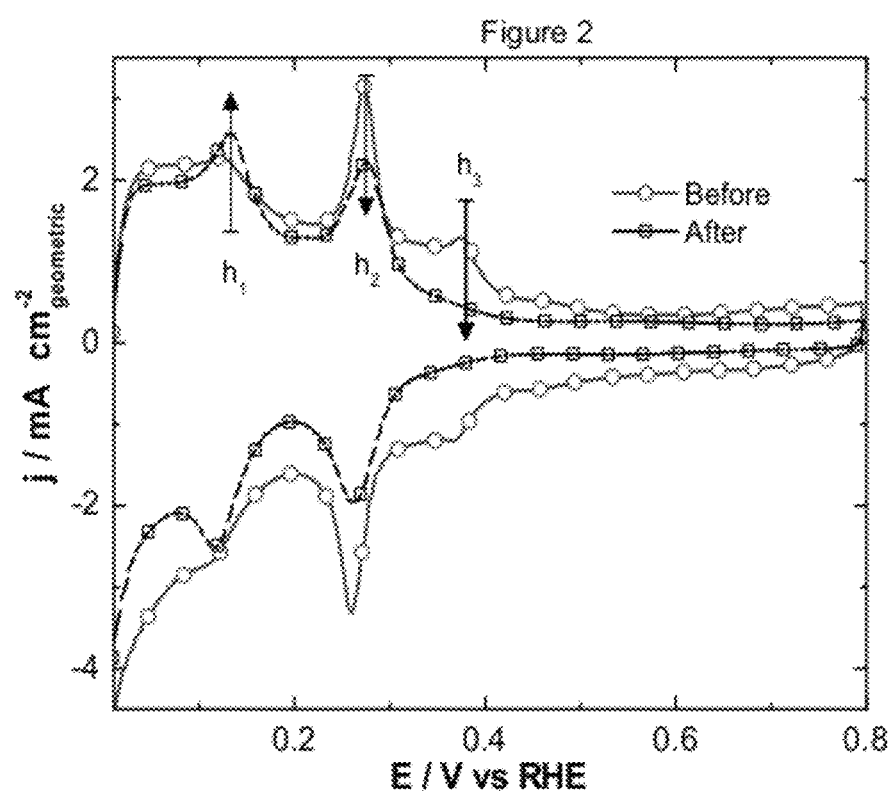
FIG. 2 shows cyclic voltammetric curves (5 mVs$^{-1}$, 0.5M H$_2$SO$_4$) of as-deposited highly-oriented {100} Pt deposits and after it was cycled up to 1.5V vs RHE (300 cycles at 50 mVs$^{-1}$)

To further emphasize that (100) sites are present at the surface of Pt deposits, a series of 300 CVs were performed between 0.05 and 1.50V vs RHE (50 mVs$^{-1}$ in 0.5M $H_2SO_4$). The CV recorded between 0.0 and 0.8V following that procedure (see FIG. 2) is radically different when compared to FIG. 1. The decrease of the voltammetric peak $h_3$ at about 0.37V, and the significant decrease of the $h_2/h_1$ ratio, reveals the loss of the wide (100) surface domains and a lower proportion of (100) exposed step sites, respectively. At the same time, there is a significant decrease of the current in the double-layer region (expressed as mA cm$^{-2}_{geometric}$), indicating that Pt dissolution, and reorganization, have taken place. Similar behavior (not shown) was observed for all Pt films which exhibited a large fraction of (100) surface sites and surface domains in the as-prepared state.

The fact that the $h_2/h_1$ peak current ratio could be irreversibly modified by increasing the positive potential limit of the scan is also a clear indication that current associated with peak $h_2$ is not related to the oxidation of a solution impurity that could have been deposited on the surface of the electrode during the preceding cathodic sweep.

The amount of (100) surface sites depends on a delicate balance between several electrodeposition parameters. As will be described hereinbelow, the influence of the deposition parameters on the structural and morphological properties of electrodeposited Pt was investigated, with the objective of identifying the conditions that give rise to Pt deposits showing the highest proportion of (100) surface sites. However, prior to that, it was shown that these films exhibit a distinctive structural characteristic, which may be recognized through their XRD patterns.

Structural Characterization

Figure 3:
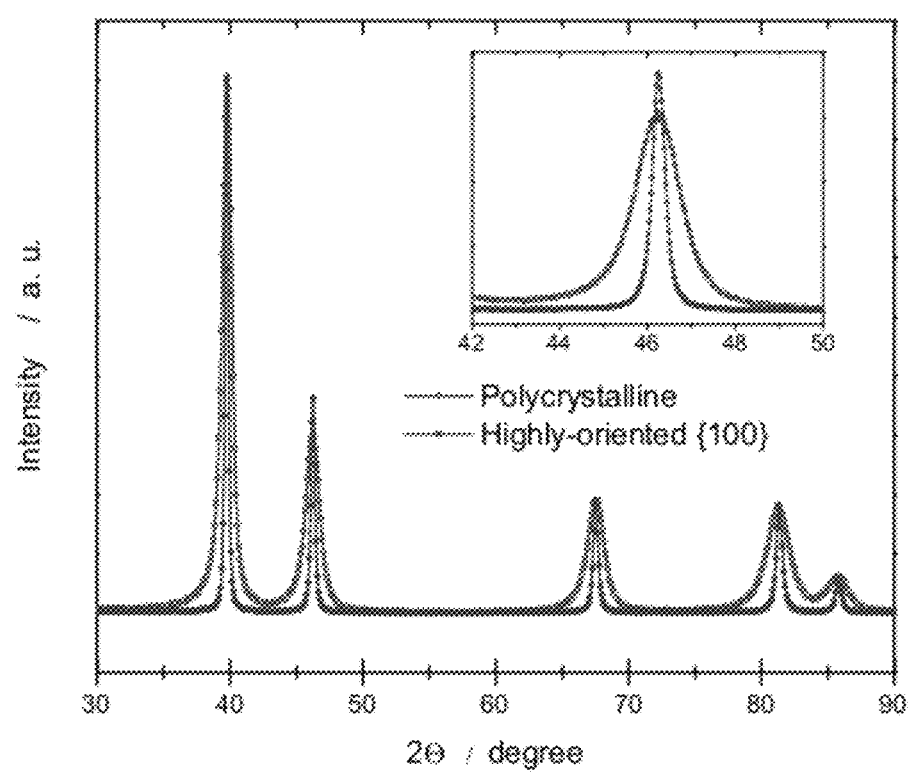
FIG. 3 shows XRD patterns of polycrystalline and highly-oriented {100} Pt deposits, normalized with respect to the intensity of the (220) peak of Pt at 2θ=67.5.

XRD patterns were recorded to characterize the bulk crystallographic structure of the Pt deposits. Typical XRD patterns of polycrystalline and highly-oriented {100} Pt deposits are shown in FIG. 3. In all cases, the X-ray diffraction patterns depict the five diffraction peaks characteristic of the face-centered cubic (FCC) structure of platinum, with peaks at 2θ=39.76°, 46.24°, 67.46°, 81.29° and 85.72°, corresponding to the crystallographic planes (111), (200), (220), (311) and (222), respectively.

The XRD patterns of the various deposits were first normalized to facilitate comparison between them. However, in some cases (not shown), the characteristic diffraction peaks of the Ti substrate were also observed. The position of the most prominent diffraction peak of Ti (2θ=40.17°, corresponding to the (101) diffraction peak) is superimposed on the (111) peak of Pt (2θ=39.76°. In most cases, this contribution is small; but a detailed analysis of the peak shape clearly indicates that the (111) peak of Pt presents a small asymmetry not observed on the other diffraction peaks of the same deposit. Therefore, there is some overlap between the (111) peak of Pt and the (101) peak of Ti, and using the integrated intensity (or the maximum intensity) of the (111) peak of Pt to normalize the various XRD patterns might introduce a systematic error. Instead, the maximum intensity of the (220) peak of Pt was chosen to normalize the XRD patterns, since the Ti substrate does not have any diffraction peaks in that region.

The XRD patterns shown in FIG. 3 have been normalized with respect to the (220) maximum peak intensity. As a result, the maximum peak intensities of all peaks of a highly {100} oriented Pt deposit (corresponding to the open square CV of FIG. 1) are identical (within 3-5%) to those observed on the XRD patterns of a non-oriented polycrystalline Pt deposit (corresponding to the open circle of FIG. 1), except for the (200) maximum peak intensity, which shows a marked difference (of about 20%) between both types of deposits (see the inset to FIG. 3). An identical conclusion is reached when the integrated intensity (instead of the maximum intensity) of the (220) peak of Pt is used in the normalization procedure. The fact that the relative intensity of the (200) peak varies is a clear indication that a preferential orientation along the {100} axis exists in some of the Pt deposits.

Figure 4:
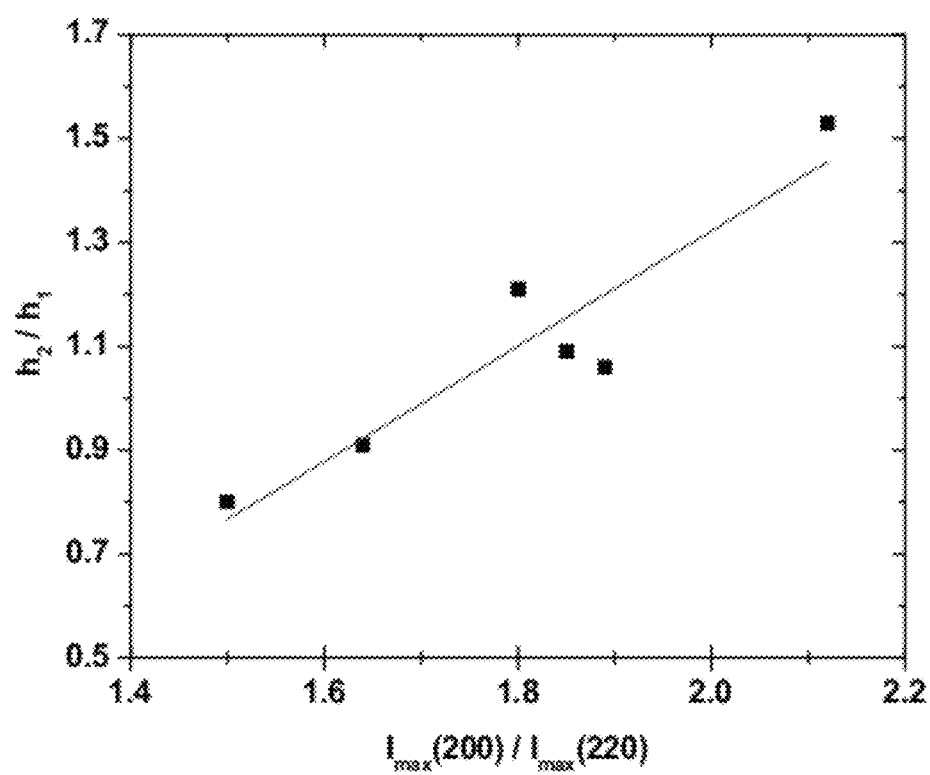
FIG. 4 shows the variation of h$_2$/h$_1$ with respect to I$_{max}$(200)/I$_{max}$(220). The h$_2$/h$_1$ ratio is determined from cyclic voltammetric curves (5 mVs$^{-1}$) in 0.5M H$_2$SO$_4$, while the I$_{max}$(200)/I$_{max}$(220) ratio is defined as the ratio between the maximum peak intensity of the (200) and (220) XRD peak of the same deposit. Data was taken from XRD patterns of both platinum thin films (TFs) and nanowires (NWs)

The evolution of the $h_2/h_1$ ratio, which is a measure of the surface orientation as determined by electrochemical measurements, with respect to $I_{max}(200)/I_{max}(220)$, defined as the ratio between the maximum peak intensity of the (200) and (220) peak of a deposit and is related to the bulk orientation of the deposition as determined by XRD measurements, is presented in FIG. 4. For as-prepared samples, there is a quasi-linear relationship between both values. This linear relationship is observed for every sample, regardless of the deposition parameters and the nature of the deposits (TF or NW). Since XRD is a bulk-sensitive technique, it is concluded that the preferential crystallographic orientation evidenced through the use of CV is also found in the bulk of the deposit. In the following section, XRD data will be used to assess the effects of the various deposition conditions on the surface orientation of the Pt deposit.

Effects of the Deposition Conditions

A series of Pt deposits were prepared by varying (i) the deposition potential, $E_{dep}$, (ii) the temperature of the electrolyte, $T_{dep}$, (iii) the presence of an AAO membrane at the surface of the Ti substrate, (iv) the Pt salt concentration, and (v) the nature of the substrate. In each case, the XRD patterns were recorded.

Figure 5:
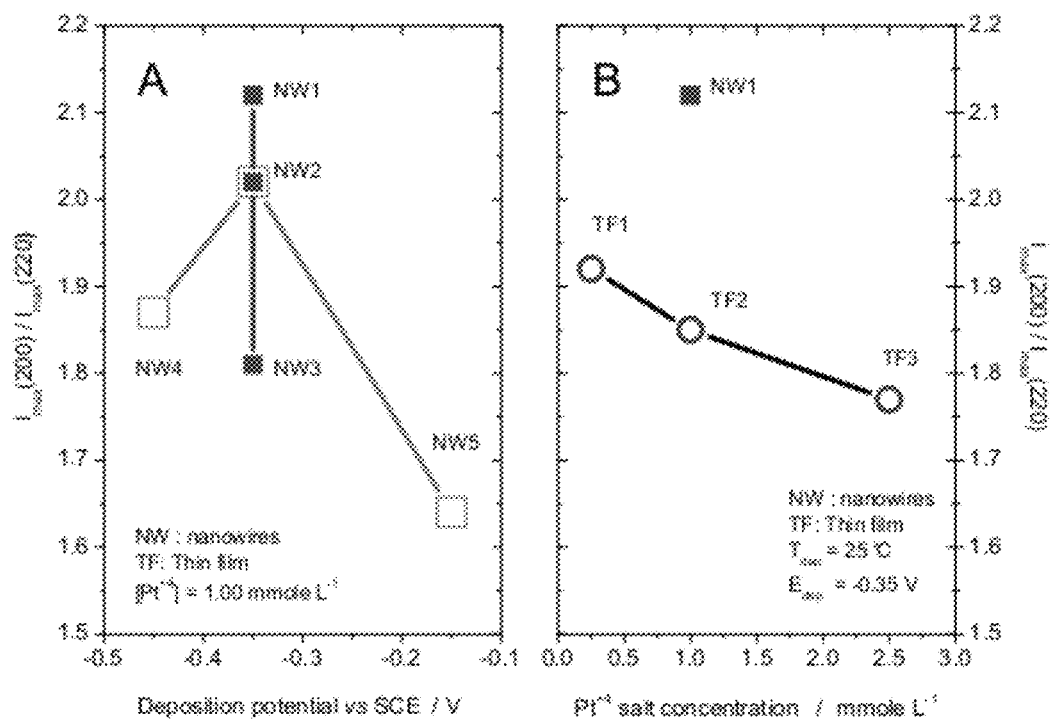
FIG. 5 shows the variation of the I$_{max}$(200)/I$_{max}$(220) ratio with respect to (A) the deposition potential and (B) the Pt$^{4+}$ salt concentration.

(i) Effect of $E_{dep}$: In this series of measurements, an AAO membrane was held firmly in front of the Ti substrate. This led to the formation of an array of Pt nanowires on the surface of the substrate. All deposition parameters were kept constant (1 mM of $Na_2PtCl_6$; 100 mM KCl; 10 mM HCl; $T_{dep}$=50° C.), except for the deposition potential, $E_{dep}$, which was varied from −0.15, −0.35 and −0.45V vs SCE for samples NW5, NW2 and NW4, respectively. As seen in FIG. 5A, the $I_{max}(200)/I_{max}(220)$ ratio increases from 1.64±0.02 to 2.02±0.02 as $E_{dep}$ is decreased from −0.15 to −0.35V. Pt nanowires prepared at more negative potential ($E_{dep}$=−0.45V) exhibit a lower $I_{max}(200)/I_{max}(220)$ ratio (1.87±0.02). A deposition potential $E_{dep}$ lower than $E_{RHE}$+150 mV is found to be effective.

It is worth noting that, according to the JCPDS card 004-0802, the (200)/(220) integrated intensity ratio of polycrystalline Pt is 1.7. As seen in FIG. 5A, Pt deposition at potentials more positive than the reversible hydrogen potential leads to the deposition of Pt film with no preferential orientation. However, lowering the potential to values more negative than the reversible hydrogen potential significantly increases the $I_{max}(200)/I_{max}(220)$ ratio which, according to the results in FIG. 5A, indicates that a significant proportion of (100) sites exist at the electrode surface. Decreasing the potential to even more negative values decreases the $I_{max}(200)/I_{max}(220)$ ratio.

(ii) Effect of $T_{dep}$: In this series of measurements, an AAO membrane was held firmly in front of the Ti substrate and Pt nanowires were formed. All deposition parameters were kept constant (1 mM of $Na_2PtCl_6$; 100 mM KCl; 10 mM HCl; $E_{dep}$=−0.35 V), except for the temperature of the deposition bath, $T_{dep}$, which was increased from 25, to 50 and to 75° C. for samples NW1, NW2 and NW3, respectively. As seen in FIG. 5A, the $I_{max}(200)/I_{max}(220)$ ratio of these deposits decreases steadily from 2.12±0.02 to 1.81±0.02 as $T_{dep}$ is increased from 25 to 75° C., showing that decreasing the electrolyte temperature has a beneficial effect on the orientation of the deposit. Although the minimum temperature that was tested was 25° C., it is believed that lower temperatures, such as 0° C. for example, would further increase the orientation effect.

(iii) Effect of the AAO membrane: the effect of the AAO membrane on the preparation of highly-oriented {100} Pt deposit was assessed by performing electrodeposition in the absence of the AAO membrane, i.e. on a smooth substrate. For this series of measurements, the conditions that yield the largest $I_{max}(200)/I_{max}(220)$ ratio were chosen (1 mM of $Na_2PtCl_6$; 100 mM KCl; 10 mM HCl; $E_{dep}$=−0.35V, $T_{dep}$=25° C.). As expected, the absence of the AAO membrane in front of the Ti substrate yield the thin film (TF2). The $I_{max}(200)/I_{max}(220)$ ratio of TF2 is about 1.85±0.02, lower than the value of about 2.12±0.02 found for NW1 prepared in the same conditions, but with an AAO membrane in front of the Ti substrate. Thus, even if the {100} preferential orientation is less marked for the Pt thin film as compared to the Pt nanowires, a significant {100} preferential orientation is also obtained for Pt deposited in the form of a thin film.

(iv) Effect of the Pt salt concentration: the Pt salt concentrations were varied from 0.25 to 2.50 mM while all other deposition parameters were kept constant (100 mM KCl; 10 mM HCl; $T_{dep}$=25° C.; $E_{dep}$=−0.35 V, no AAO membrane). In this series of measurements, the AAO membrane was omitted and Pt was deposited in the form of a thin film (TF1, TF2 and TF3 for 0.25, 1.00 and 2.50 mM Pt salt concentrations, respectively). As seen in FIG. 5B, the $I_{max}(200)/I_{max}(220)$ ratio decreases steadily from 1.92±0.02 to 1.77±0.02 as the $Na_2PtCl_6$ concentration is increased from 0.25 mM to 2.5 mM, indicating that the {100} preferential orientation of Pt is enhanced by decreasing the Pt salt concentration in the plating bath. Because of the formation mechanism involved, lower Pt salt concentration is believed to yield even more enhanced orientation effect.

(v) Effect of the substrate: the deposition of Pt was performed on Ti and carbon cloth substrates using the experimental conditions that yield highly-oriented {100} Pt surfaces (1 mM $Na_2PtCl_6$; 10 mM HCl; 100 mM KCl; $T_{dep}$=25° C.; $E_{dep}$=−0.35V, no AAO membrane). The diffraction peaks of the carbon cloth substrate interferes with those of the FCC phase of platinum and it was not possible to rely on a measure of the $I_{max}(200)/I_{max}(220)$ ratio to assess the degree of orientation achieved on these two substrates. However, the CVs of both deposits recorded at 5 mV·s$^{-1}$ in 0.5M $H_2SO_4$ are superimposable on each other (not shown), indicating that the same degree of {100} orientation can be achieved on both substrates. The formation of highly-oriented {100} Pt appears not to be dependent on the nature and geometry of the substrate.

Morphological Characterization

Figure 6:
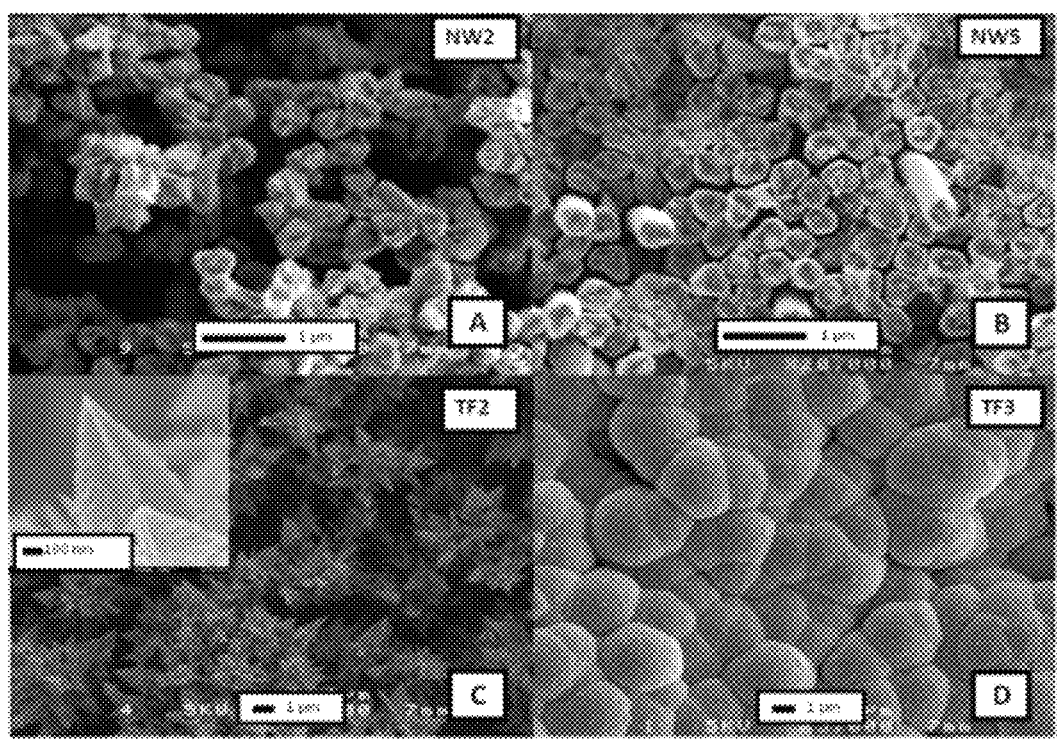
FIG. 6 shows SEM micrographs of Pt nanowires (A and B, corresponding to samples NW2 and NW5, respectively) and Pt thin films (C and D, corresponding to samples TF2 and TF3, respectively). In (A) and (C), the deposition conditions (1 mM Na$_2$PtCl$_6$, 10 mM HCl, 100 mM KCl, T$_{dep}$=25° C. and E$_{dep}$=−0.35 V) are such that highly-oriented {100} Pt deposits are formed. In (B) and (D), the deposition conditions are such that the structure of the deposit is closer to polycrystalline Pt. The insert shows a high magnification micrograph of TF2. The R$_f$ values of NW2, NW5, TF2 and TF3 are 365, 1016, 666 and 411, respectively.

Scanning electron microscopy (SEM) micrographs of various Pt deposits are shown in FIG. 6. The Pt deposits were prepared in deposition conditions which produced highly {100} oriented (FIG. 6A and FIG. 6C, corresponding to samples NW2 and TF2, respectively) and non-oriented polycrystalline deposits (FIG. 6B and FIG. 6D, corresponding to samples NW5 and TF3, respectively). In the case of highly-oriented {100}, the SEM micrographs reveal that both types of deposit (NW and TF) consist of small crystallites with very sharp edges. The insert to FIG. 6C (higher magnification) reveals that these crystallites have a pine tree-like structure made of distinct branches which overlap each other. By contrast, such small crystallites with sharp edges are not seen on NW and TF formed in the conditions giving rise to polycrystalline Pt.

Figure 7:
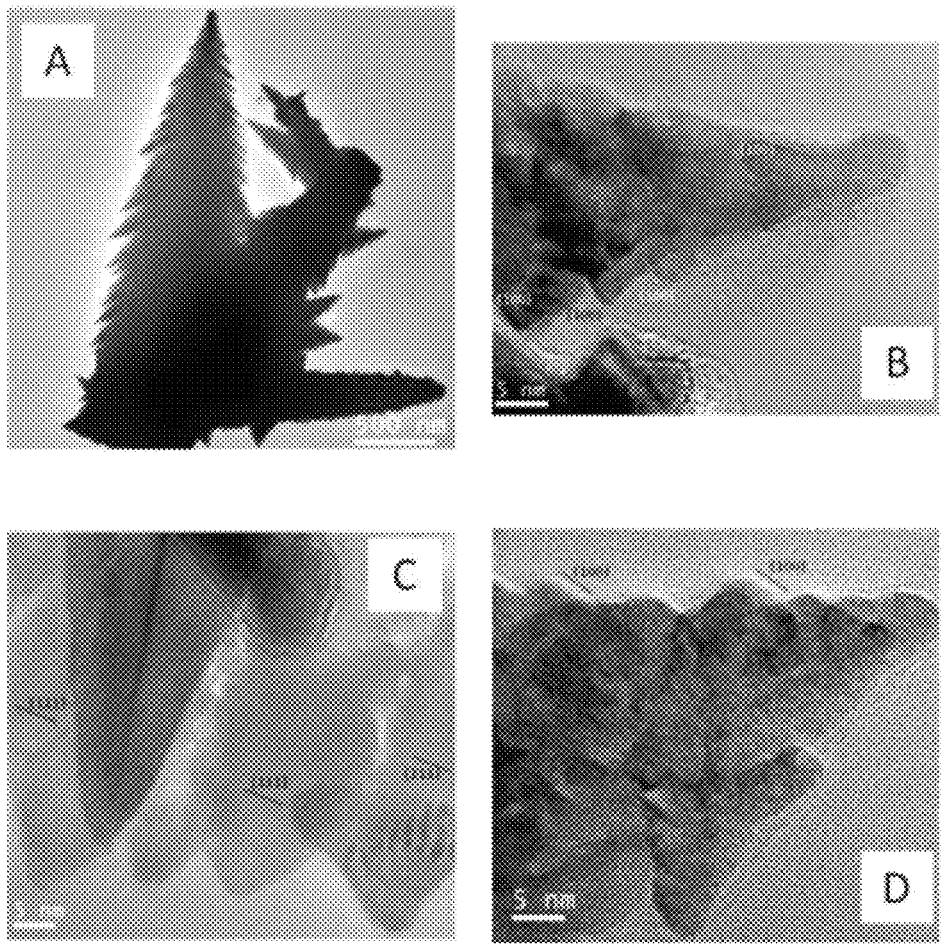
FIG. 7 shows TEM micrographs of pine-shaped Pt nano structures: (A) low-magnification micrograph, (B) high-resolution image of one of the Pt nanostructure branches highlighting the {100} type steps, (C) high-resolution image of several tips of the Pt nanostructure, demonstrating consistent crystallographic orientation from branch to branch, (D) high-resolution image, again highlighting {100} type steps in the Pt nanostructure.

Low magnification transmission electron microscopy observations of pine tree-like structures support the low-resolution imaging from the SEM and demonstrate, in addition, highly parallel growth facets on each one of the visible branches (FIG. 7A). The branches of one single pine tree-like structure are parallel to each other (FIG. 7A) and present highly crystalline lattice (FIG. 7B) with planes parallel to each other even on adjacent branches (FIG. 7C). This indicates that the pine tree-like structure is effectively single crystals. Higher-resolution imaging shows that the growth facets appear to be close to the {100} plane (FIG. 7D) which suggests that the growth occurs through the motion of steps on the {100} type plane. This observation also clearly indicates that the plane exposed during the CV experiment is also {100}.

A review of the literature is helpful in understanding the effects of the deposition parameters on the structure of the Pt deposit and how they affect the formation of preferentially-oriented {100} Pt surfaces. There have been many reports in the literature dealing with the preparation of Pt cubic particles showing a preferential orientation of their surface along the (100) axis. They are synthesized in the form of colloidal platinum, using a capping agent (sodium polyacrylate) and hydrogen gas as a reducing agent. It was shown that the sizes and shapes of the Pt particles were controlled by changes in the ratio concentration of the capping polymer material to the concentration of the Pt cations used. According to high-resolution transmission electron microscopy (HRTEM), these nanoparticles show flat surfaces with {100} facets, and the distances between the adjacent lattice fringes are the interplanar distance of Pt {200}. Pt nanoparticles prepared by the same method have been shown to exhibit the characteristic hydrogen adsorption/desorption peaks, CO-stripping peaks, as well as the characteristic response of irreversibly-adsorbed germanium on (100) terraces of platinum. The mechanisms responsible for this effect were identified and are related to the preferential growth of facets due to the adsorption of an organic compound ("capping compound"). As described hereinbelow, no capping agent was used in this study, and the mechanisms responsible for the formation of thin films and nanowires with preferentially-oriented {100} surfaces do not involve the adsorption of an organic compound.

In proton exchange membrane fuel cells, soluble Pt species are reduced by hydrogen permeating from the anode to the cathode side. It was recently shown that the morphology of Pt nanoparticles changed from dentritic shapes to truncated tetrahedrons, truncated octahedrons, and truncated square cuboids as we move away from the carbon support and closer to the membrane-cathode interface.

The equilibrium shape of an isolated single crystal is determined by the relation $\gamma_i A_i$=minimum, where $\gamma_i$ is the surface free energy per unit area $A_i$ of exposed surface (assuming that edge and curvature effects are unimportant). In ideal FCC metals, one would expect the surface free energies to order as $\gamma(111)<\gamma(100)<\gamma(110)$, since surface atom densities are ordered in this manner. This has been confirmed by theoretical studies showing that the surface energy of $\{100\}_{Pt}$ is 190 kJ·mol$^{-1}$ per surface Pt atom compared to 153 kJ·mol$^{-1}$ for $\{111\}_{Pt}$. Accordingly, the formation of truncated square cuboid-type shapes with predominantly exposed {100} Pt planes is not expected unless the surface free energies of the crystallographic planes are modified. However, the adsorption of hydrogen at the surface of Pt will modify the surface free energy of the various crystallographic surfaces. As discussed in the art, the enthalpy of $H_2$ adsorption on the $\{100\}_{Pt}$ is 40-60 kJ·mol$^{-1}$ higher than the $\{111\}_{Pt}$ surfaces. Accordingly, the surface free energy of $\{100\}_{Pt}$ in the presence of $H_2$ is lower than $\{111\}_{Pt}$ surfaces and the growth of truncated square cuboid-type shape Pt nanoparticles with predominantly exposed {100} Pt planes is not unexpected in the section of the membrane-electrode assembly closest to the anode of the fuel cell where the concentration of $H_2$ is higher. Reduction of $K_2PtCl_4$ using $H_2$ (without capping polymer) consistently leads to the formation of Pt cubic nanocrystalline particles. By contrast, reduction of $H_2PtCl_6$ with $NaBH_4$ in ethanol and water or with formic acid results in polycrystalline metallic Pt. All of this suggests that, in the absence of any surfactant or capping agent, reduction of Pt cations in the presence of hydrogen leads to the formation of Pt nanocrystalline particles with highly {100} oriented Pt surfaces. This is consistent with studies indicating that the morphology of Pt nanoparticles supported on $SiO_2$ and $\gamma$-$Al_2O_3$ is influenced by the gaseous species, and that Pt nanoparticles with predominantly {100} (and {110}) surface planes are grown at high temperature in $H_2$, while all surface crystal planes are formed if they are heated in other gases.

Based on the aforementioned considerations, the presence of hydrogen species ($H_2$ or $H_{ads}$) is thought to modify the free surface energy of the various crystallographic surfaces of Pt. Accordingly, the results in FIG. 5 may be explained as follows. Electrodeposition of Pt was performed at various electrode potentials (NW2, NW5 and NW4 in FIG. 5A). The $H_2/H_2O$ reversible potential is −0.24V vs SCE in 0.5M $H_2SO_4$ solution. Therefore, when deposition is performed at $E_{dep}$=−0.35V/SCE, $H_2$ is present in the solution and, based on the aforementioned considerations, the formation of a larger fraction of highly-oriented {100} Pt surfaces at $E_{dep}$=−0.35V compared to $E_{dep}$=−0.15 V is expected (hydrogen evolution is not occurring at that potential, and hydrogen adsorption on Pt surfaces is minimal at $E_{dep}$=−0.15V vs SCE). More surprising is the fact that the fraction of highly-oriented {100} Pt surfaces decreases as the deposition is made more negative ($E_{dep}$=−0.45V vs SCE), despite the fact that hydrogen evolution is more important at more negative potential. This can be understood by considering that the fraction of highly-oriented {100} Pt surfaces decreases as the concentration of $Pt^{4+}$ cations increases in the solution (see FIG. 5B). It is hypothesized that stronger hydrogen evolution leads to forced convection in the vicinity of the electrode surface, therefore increasing the concentration of $Pt^{4+}$ cations (see below). Although this effect is not negligible, the fraction of highly {100} oriented Pt surface, as measured by the $I_{max}(200)/I_{max}(220)$ ratio at $E_{dep}$=−0.45V, remains higher than at $E_{dep}$=−0.15 V.

The electrochemical deposition of platinum from hexachloroplatinic acid involves at least two heterogeneous electron transfer processes:

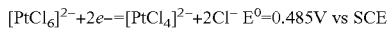

$[PtCl_6]^{2-}+2e-=[PtCl_4]^{2-}+2Cl^-$ $E^0$=0.485V vs SCE

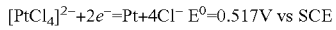

$[PtCl_4]^{2-}+2e^-$=Pt+$4Cl^-$ $E^0$=0.517V vs SCE

Films and nanowires were deposited at potentials more negative than about −0.15V vs SCE. In all cases, the overpotential during the deposition of Pt thin films and nanowires is at least 650 mV. Therefore, it is expected that deposition of metallic Pt is limited by mass transfer (instead of being kinetically limited). According to the Nernst-Planck equation, there are three terms that govern the unidirectional flux of a species j to a substrate: (i) migration, (ii) convection, and (iii) diffusion. All the deposits created in this study were made in the presence of a supporting electrolyte ([KCl]=100 mM). The concentration of the supporting electrolyte exceeds the hexachloroplatinic acid by a factor of one hundred, which means that contribution of migration to the mass-transport of the Pt complex toward the electrode could be neglected. Also, as all deposits were realized in quiescent electrolytes, convection is not expected to play a major role except perhaps in those cases where hydrogen evolution is occurring (for $E_{dep}$ more negative than −0.24V vs SCE), causing unwanted convection of the solution (see above). Therefore, at any given potential, the Pt deposition current is mainly governed by the diffusion of Pt species to the electrode surface, which is thus given by $i=nFD_{Pt}(c_{bulk}-c_{x=0})/\delta$, where these symbols have their usual meaning. Accordingly, the deposition current at any given potential will increase with the hexachloroplatinic acid's bulk concentration, and will decrease as diffusion of the Pt species becomes more sluggish as the temperature of the electrolyte is decreased.

As seen in FIG. 5B, decreasing the $Na_2PtCl_6$ salt concentration from 2.50 to 0.25 mM and the bath temperature from 75 to 25° C. increases the $I_{max}(200)/I_{max}(220)$ ratio. As shown hereinabove, the deposition current is decreased as the concentration of Pt species and temperature of the bath are diminished, which in turn favors the formation of highly-oriented {100} Pt surfaces.

The Pt deposition rate was determined at $E_{dep}$=−0.35V, $[Na_2PtCl_6]$=0.25 mM and $T_{dep}$=25° C., using an electrochemical quartz crystal microbalance (data not shown). These conditions correspond to TF1 in FIG. 5B. The mass varies linearly with time over a period of 8 hours (the measurement was stopped after that). The slope of the mass vs time curve is about 5 $ng·s^{-1}·cm^{-2}$ or $1.5×10^{13}$ $Pt·atoms·s^{-1}·cm^{-2}$. As expected, the Pt deposition rate at $E_{dep}$=−0.35V, $[Na_2PtCl_6]$=2.50 mM and $T_{dep}$=25° C., which corresponds to the deposition conditions of TF3 in FIG. 5B, is 50 $ng·s^{-1}·cm^{-2}$, ten times larger. These deposition rates correspond to about 1 and 10% of a monolayer per second, respectively. The effect of temperature on the deposition current (and hence on the diffusion coefficient) could not be ascertained, as it was impossible to control the temperature of the EQCM set-up.

From an atomistic viewpoint, the electrodeposition of $PtCl_6^{2-}$ occurs through its transfer from the solution into the ionic metal lattice. The first step of this process is the adsorption of the Pt species and its subsequent diffusion to a kink site of the {100} oriented Pt surface (it is generally assumed that atoms (ions) are attached to a crystal via a kink site). As may be inferred from the relation between the Pt deposition rate and the proportion of {100} oriented Pt surfaces, the interfacial kinetics of Pt attachment on {100} surfaces of Pt are small. It is hypothesized that diffusion of the Pt species to a kink site must be the rate-limiting step, since the formation of highly-oriented {100} Pt surfaces can be obliterated if the Pt deposition rate is large.

In identical deposition conditions, the presence of an AAO membrane increased the proportion of highly-oriented {100} Pt surfaces (see FIG. 5B). This arises because part of the flux of Pt species to the electrode surface is not due to diffusion alone, since hydrogen evolution occurring at that potential ($E_{dep}$=−0.35V vs SCE) is causing a slight convective movement in the electrolyte. Under our experimental conditions, the diffusion layer thickness, $\delta_0$, is about 5 mm ($C_0^*$=1×$10^{-6}$ $mole·cm^{-3}$, $D_0$=2.5×$10^{-11}$ $mole·s^{-1}·cm^2$, $i/nFA$=2.5×$10^{-11}$ $mole·s^{-1}·cm^2$) larger than the thickness of the AAO membrane (typically ~60 μm), it is hypothesized that the effective concentration gradient is lower when deposition is performed in the presence of the AAO membrane, yielding a slower Pt deposition rate. Unfortunately, it was impossible to measure the Pt deposition rate in the presence of the AAO membrane using the EQCM set-up.

The proportion of highly-oriented {100} Pt surfaces depends on the sample being removed from the solution immediately after the end of the deposition period and not left in open circuit in the deposition bath. The effect of open-circuit potential on the orientation and morphology of highly-oriented {100} Pt deposit is described in detail herein below.

As mentioned in the introduction, several papers have appeared in the literature describing an electrochemical procedure to obtain Pt electrode surfaces with preferred orientations from bulk polycrystalline platinum. The procedure used to achieve this was on the use of repetitive potential sweeps at high frequency under carefully-selected potential perturbation conditions. It was shown that the anodic and cathodic limits of 1.50V and 0.05V/RHE, respectively, were deemed necessary to enhance the {100} preferential orientation, as it was not observed for lower and higher positive and negative potential limits. It was hypothesized that the formation of {100} facets occurs as a result of the formation of a jelly-like metal atom lattice at the positive limit of the scan, which is able to accommodate preferred orientations. Then, the formation of preferentially-oriented {100} surfaces depends on the presence of H, which occurs when the negative limit of the scan is 0.04V vs RHE. In that case, it was hypothesized that the presence of H-adatoms interacting with the metal lattice likely facilitates the formation of a surface structure with a high contribution of (100)-like sites. When the negative limit of the scan is 0.40V vs RHE, H is not present in the vicinity of the electrode surface and {111}-like surface sites are formed. Surface reconstruction was only observed in the case where repetitive triangular potential sweeps between the upper and the lower potential limit were performed at a relatively high frequency (>1000V·s$^{-1}$). However, under these conditions, the roughness factor of the preferentially-oriented {100} Pt surface is low and does not exceed R=3. Experimental evidence of surface modification, and crystalline rearrangements were evidenced through scanning tunneling microscopy and XRD, respectively.

The present deposits do not involve the modification of a pre-existing Pt layer and may be grown on a variety of substrates like Ti and carbon paper (see below). Moreover, both Pt thin films and nanowires may be prepared with a large proportion of preferentially-oriented {100} surfaces. Also, highly-oriented {100} Pt deposits may be obtained with very high roughness factors. Typical $R_f$ values of about 400 and 700 were obtained for the highly-oriented {100} Pt thin films (see FIG. 6C) and nanowires (see FIG. 6A), respectively. These roughness factors are at least two orders of magnitude larger than those reported in the art. As will be described hereinbelow, the capacity to form highly-oriented {100} Pt thin film and nanowire with very high roughness factors will prove important for the oxidation of hydrazine and ammonia, two reactions known to be favored by the presence of {100} surfaces.

Electro-Oxidation of Hydrazine (Acidified Solution) and Ammonia (Alkaline Solution)

The electro-oxidation of hydrazine ($N_2H_4$) is a surface structure-sensitive reaction, and its reaction rate is higher at Pt (100) surface sites compared to other low Miller Index surface orientation. Hence, the formation of porous and highly-oriented {100} Pt surfaces may be of interest as an anode catalyst for Direct Hydrazine Fuel Cells (DHFC). As a consequence, the use of preferentially-oriented {100} Pt surfaces is a practical strategy to increase the electrocatalytic activity of platinum electrodes for the electro-oxidation of hydrazine.

Figure 8:
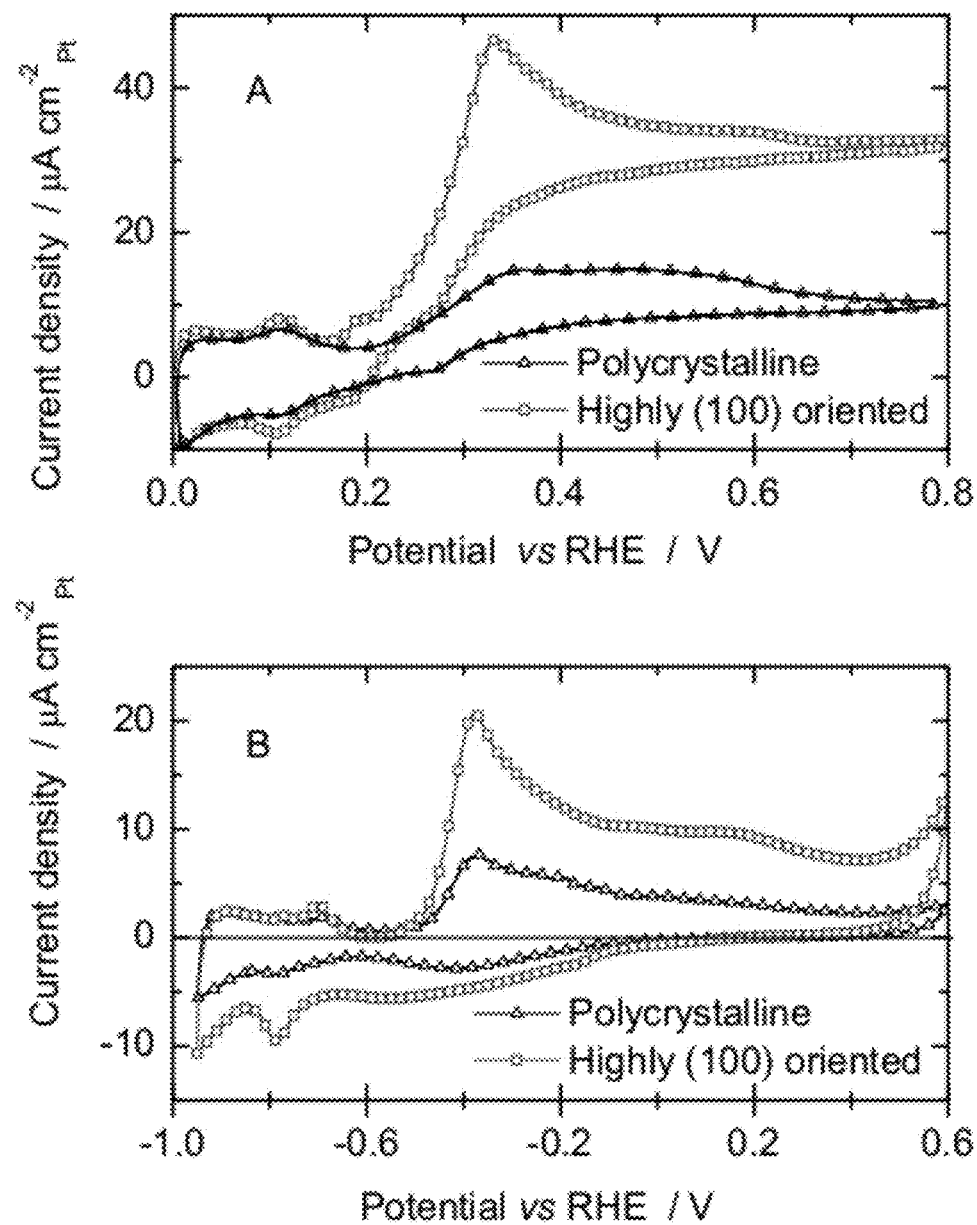
FIG. 8 shows: (A): cyclic voltammogram (5 mVs$^{-1}$) in 0.5M H$_2$SO$_4$+10 mM N$_2$H$_4$ of a polycrystalline and highly-oriented {100} Pt thin films. The roughness factors, R$_f$, of the polycrystalline and highly-oriented {100} Pt thin films are 200 and 70, respectively. (B): cyclic voltammogram (5 mVs$^{-1}$) in 0.1M NaOH+10 mM NH$_3$ of a polycrystalline and highly-oriented {100} Pt thin films. The roughness factors of the polycrystalline and highly-oriented {100} Pt thin films are 590 and 190, respectively.

In FIG. 8A, a comparison is made between the CV of polycrystalline and highly-oriented {100} Pt surfaces immersed in 0.5M $H_2SO_4$+10 mM $N_2H_4$. The primary characteristic feature of these CVs is the presence of a large oxidation peak at about 0.35V vs RHE with no reduction peak counterpart during the reverse sweep, which indicates that the oxidation of $N_2H_4$ occurs as a result of a highly irreversible process that yields the formation of gaseous $N_2$.

Another typical voltammetric feature of preferentially-oriented Pt electrode is the presence of a quasi-reversible oxidation/reduction peak at about 0.20V vs RHE on highly-oriented {100} Pt surfaces. As demonstrated earlier, this peak is related to the oxidative adsorption of hydrazine at low potentials, and is observed only on Pt (100) single crystal surfaces. There is a significant negative shift of the oxidation peak current potential ($E_p$) from 0.38V (polycrystalline) to 0.32V (highly-oriented {100}). This shift of $E_p$ towards more negative values is attributed to the predominance of {100} microfacets at the surface of the highly-oriented Pt deposit. It is accompanied by a factor of four difference between the specific activities of these two types of deposit, as measured by the peak current, $i_p$ (expressed as $\mu A\ cm^{-2}{}_{Pt}$).

The study of the electrochemical behavior of ammonia is important for environmental electrochemistry, such as water and air analysis through electrochemical sensors and electrochemical oxidation of ammonia from wastewater streams for example. More recently, ammonia has attracted attention for the production and storage of hydrogen, and as a possible fuel for direct fuel cells. The oxidation of ammonia on platinum was shown to be a surface-sensitive reaction which takes place almost exclusively on surface sites with (100) symmetry. Consequently, the use of preferentially-oriented {100} Pt surfaces is a practical strategy to increase the electrocatalytic activity of platinum electrodes for the electro-oxidation of ammonia.

In FIG. 8B, the oxidation of ammonia in 0.1M NaOH was performed on polycrystalline and highly-oriented {100} porous Pt electrodes. The electrocatalytic activity of highly-oriented {100} Pt, as given by the normalized current density expressed in $\mu A\ cm^{-2}{}_{Pt}$, is increased by a factor of 2.7 as compared to polycrystalline platinum electrode, emphasizing the fact that not all Pt atoms on the surface of the deposit are equivalent.

Further studies were done (FIGS. 9, 10), using the experimental set up used hereinabove, in which Ti substrates were first mechanically polished (Struers, P#240 silicon paper) and then sonicated twice in methanol (5 minutes) to remove any silicon particles that might have been included into the substrate. The Ti substrates were then etched in hot (90° C.) oxalic acid 10 wt % solution for one hour. Finally, the Ti substrates were thoroughly rinsed with de-ionized water and dried under a constant flow of nitrogen gas. The experimental setup for the preparation of Pt NWS consists of a working electrode (WE) that was composed of three parts, namely a Ti substrate, an anodic aluminum oxide (AAO) membrane, and a porous glass plate. Commercially available AAO membranes (Anodisc 25, Whatman International Ltd.) were used as porous templates. In this study, AAO membranes with 200 nm pore diameters were used. The porous glass plate (3 cm diameter glass plate, porosity between 145 and 174 μm, Ace Glass Inc.) allowed the pressure applied by the clamps to be distributed evenly on the surface of the AAO membrane. The open structure of the porous glass plate ensured that diffusion of dissolved $Pt^{4+}$ species to the AAO membrane was not hindered. Finally, two clamps held together the different parts that made up the working electrode. The use of clamps minimizes the gap between the Ti substrate and the AAO membrane. The AAO membrane was humidified with electrolyte prior to being inserted in the experimental setup, so as to minimize air bubbles in the membrane.

Effect of the Open-Circuit Potential

The effect of open-circuit potential on the orientation and morphology of the Pt deposits was investigated by preparing two samples in exactly the same conditions (1 mM $Na_2PtCl_6$; 100 mM KCl; 10 mM HCl; $T_{dep}$=25° C.; $E_{dep}$=−0.35 V), except that the first one (TF2) was removed from the solution immediately at the end of the deposition period (and thoroughly rinsed with deionized water), while the second one (TF5) was left overnight in the electrolyte at open-circuit potential (OCP) conditions.

The CV of TF2 (not shown) is typical of highly-oriented {100} Pt deposit, with a $h_2/h_1$ peak current ratio of 1.09. By contrast, the CV of TF5 (not shown) is typical of a polycrystalline Pt deposit with a $h_2/h_1$ peak current ratio of 0.62. Thus, based on the electrochemical response, there is a significant difference between the surface orientations of these two deposits. However, this difference is not mirrored at the bulk level. Indeed, the $I_{max}(200)/I_{max}(220)$ ratios of both deposits display very similar values (about 1.85 and 1.81 for TF2 and TF5, respectively), indicating that they have very similar bulk preferential orientation. This discrepancy between the bulk and surface orientations is thought to arise because one of them (TF5) was left in OCP conditions for 9 hours, while the other one (TF2) was removed from the electrolyte immediately after the deposition period.

Figure 10:
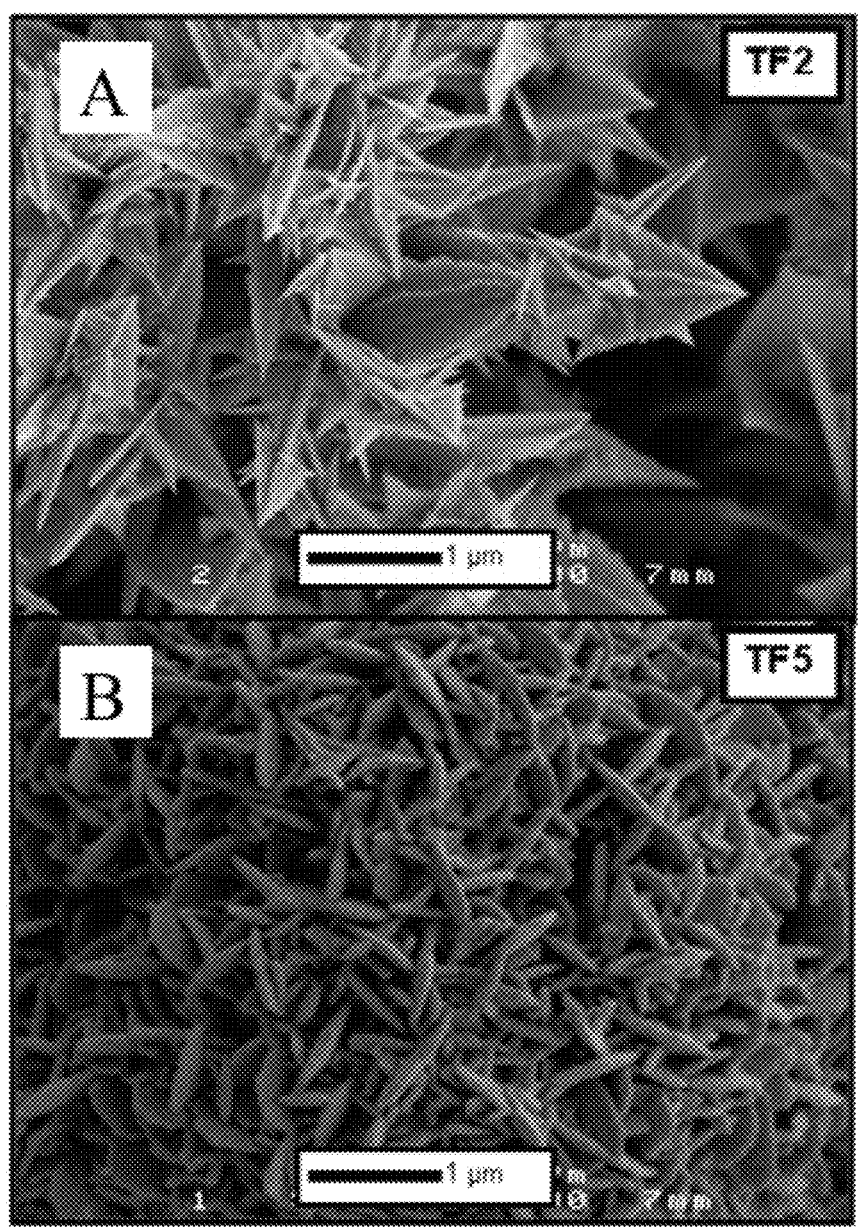
FIG. 10 shows SEM micrographs of Pt thin films prepared in similar conditions (1 mM Na$_2$PtCl$_6$, 10 mM HCl, 100 mM KCl, T$_{dep}$=25° C. and E$_{dep}$=−0.35V), except that (A) TF2 was removed from the electrolyte and rinsed immediately after deposition, while (B) TF5 was left in the electrolyte overnight (9 hours) at open-circuit potential conditions following deposition.

This hypothesis is supported by the scanning electron microscopy micrographs in FIG. 10, which indicate that the surface morphology of the two deposits is clearly different. TF2 displays very sharp, faceted structures similar to what was observed previously, whereas TF5 displays much smoother features, with plate-like structures that are thought to have formed during the OCP period.

The preparation of Pt thin films and nanowires through the electrochemical reduction of $Pt^{4+}$ cations in acidified solution has been studied previously A. Ponrouch, S. Garbarino, S. Pronovost, P. L. Taberna, P. Simon, D. Guay, *J. Electrochem. Soc.* 2010, 157, K59. In the absence of hydrogen, the open-circuit potential of a Pt electrode in contact with 5 mM $Na_2PtCl_6$ and 10 mM HCl is about +0.60V. However, for deposition performed at potential more negative than the reversible $H_2$ potential, molecular hydrogen is formed concomitantly with Pt reduction. In these conditions, the OCP varies rapidly from $E_{dep}$ to the reversible hydrogen potential at the end of the deposition period. It will remain constant at that value (−0.23V vs SCE in our experimental conditions) for a period of several minutes, depending on the amount of $H_2$ gas dissolved in the electrolyte. As shown by an electrochemical quartz crystal microbalance study, the mass of the electrode increases steadily during this period, indicating that Pt deposition at the surface of the electrode is occurring. Therefore, if the bulk of TF5 is deposited at $E_{dep}$=−0.35V, a potential that was shown to yield the formation of highly-oriented {100} Pt, its utmost external layer is formed by chemical reduction of the $Pt^{4+}$ cations by molecular hydrogen evolved during electrodeposition. Thus, the electrochemical response of TF5 is attributed to the presence of a thin layer of polycrystalline Pt that is deposited during OCP at the surface of otherwise highly-oriented {100} Pt crystallites. Therefore, the OCP period after deposition is an important parameter to be taken into account, as it can modify the surface structure of the Pt deposit and possibly mask the preferential orientation of the underlying bulk deposit.

Figure 11:
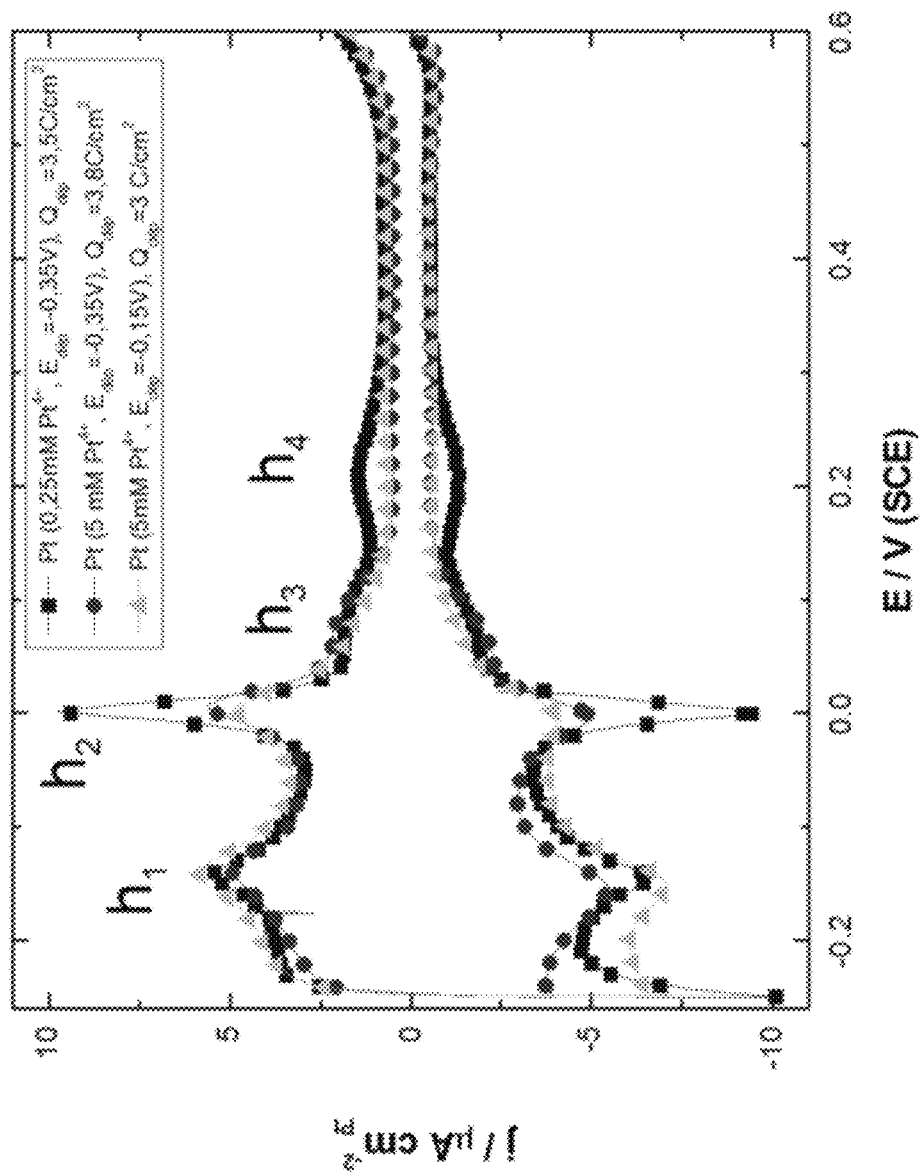
FIG. 11 shows cyclic voltammograms (5 mV s$^{-1}$, 0.5M H$_2$SO$_4$) for electrodeposited Pt films for Q$_{dp}$=3.5 C cm$^{-2}$, for different electroplating conditions: 5 mM Na$_2$PtCl$_6$.6H$_2$O, 10 mM HCl, E$_{dep}$=−0.15V: triangles; 5 mM Na$_2$PtCl$_6$.6H$_2$O, 10 mM HCl, E$_{dep}$=−0.35V circles; and 0.25 mM Na$_2$PtCl$_6$.6H$_2$O, 10 mM HCl, E$_{dep}$=−0.35V squares.
Figure 12:
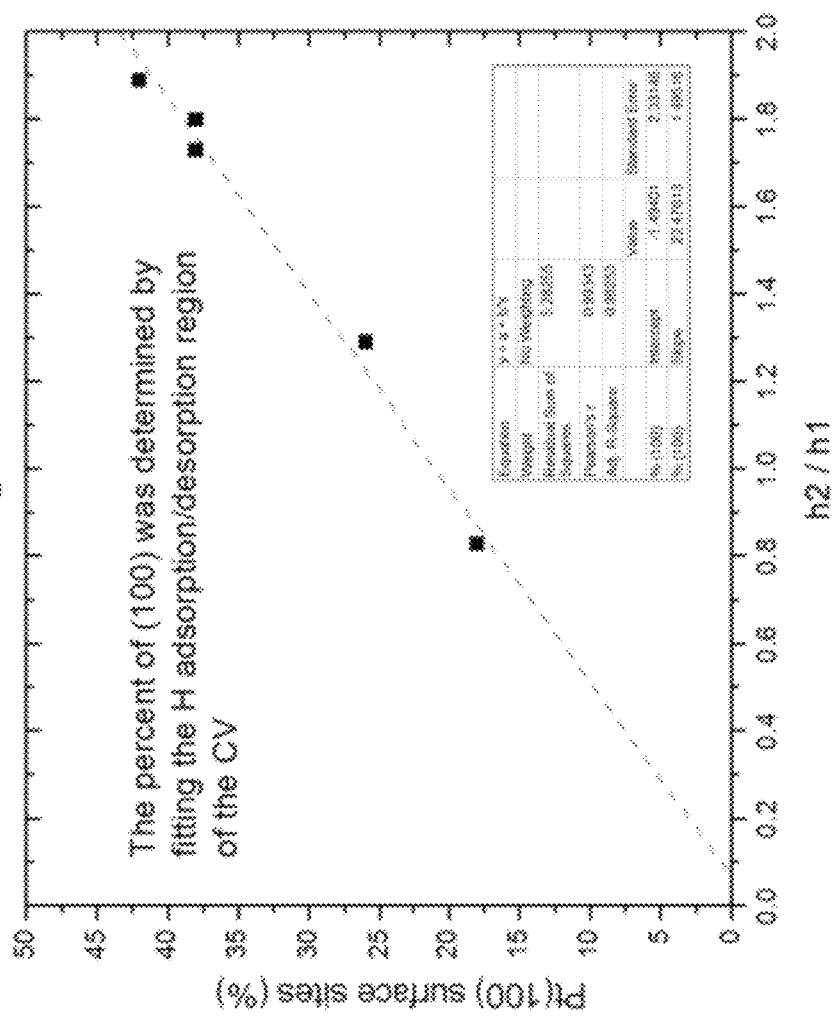
FIG. 12 shows a linear relationship between h$_2$/h$_1$ and proportion of Pt (100) surface sites determined by electrochemical analyses.
Figure 14:
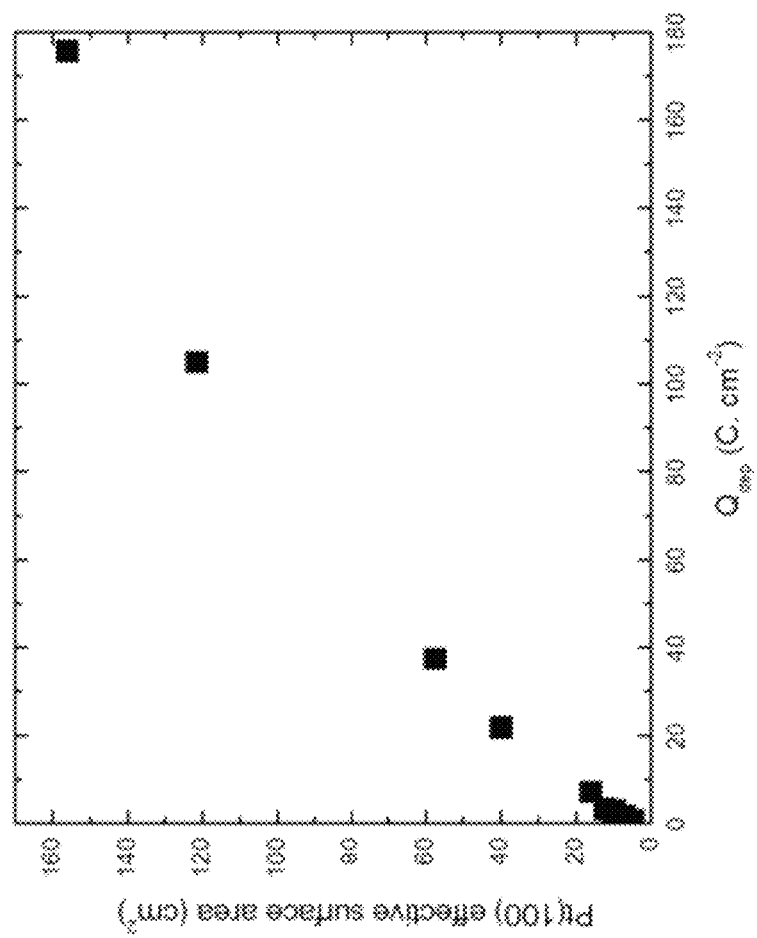
FIG. 14 shows effective amount of the Pt (100) surface orientation versus the electrodeposition charge (Q$_{dep}$)
Figure 15:
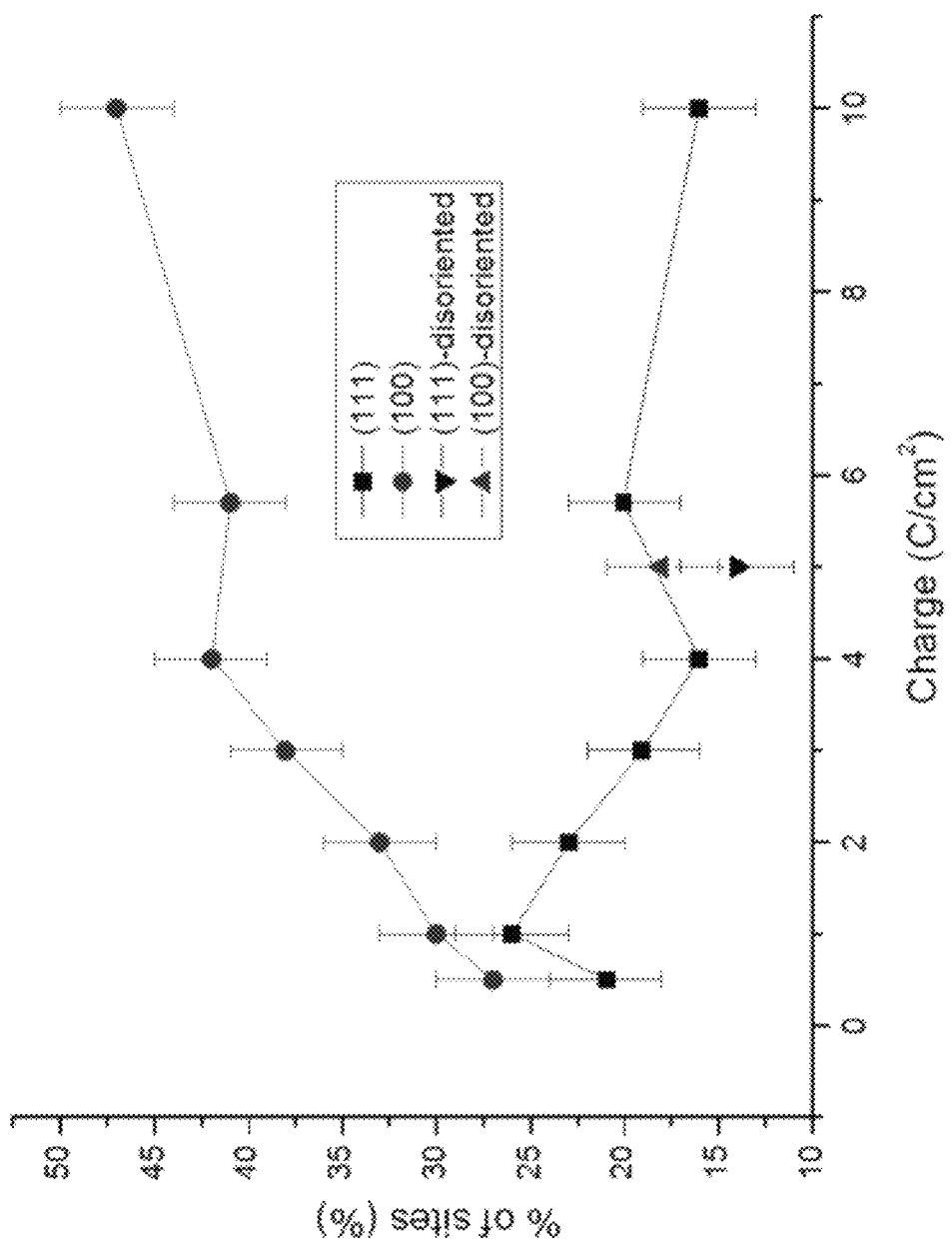
FIG. 15 shows the relation between the deposited charge and the amount of (100) and (111) sites for thin films prepared −0.35 V vs SCE. For comparison, the values of a disoriented sample (triangles) are also presented.

Further analysis were done to characterize the formation parameters of Pt (100): identification of the (100) surface orientation (FIG. 11), quantification of the (100) surface orientation (FIG. 12); influence of the electrodeposition charge ($Q_{dep}$) on the Pt surface area properties (FIG. 13); influence of the electrodeposition charge ($Q_{dep}$) on the Pt surface area properties (FIG. 14); effective amount of the Pt (100) surface orientation (FIG. 15). From these figures, it may be concluded that increasing the electrodeposition charge ($Q_{dep}$) leads to an increase of total Pt effective surface area (FIG. 13A), and an increase of total Pt (100) surface sites (FIG. 14), proportions being obtained by combining data from FIG. 12 and FIG. 13B.

FIG. 13A clearly shows that the oriented deposits obtained are porous. A rugosity ranging from about 8 to 420 is observed. FIG. 13B clearly shows that Pt deposits of the same thickness obtained under non-optimal conditions, i.e. at a deposition potential of −0.15 vs SCE for example, are non-oriented.

FIG. 15 shows the relation between the deposited charge and the amount of (100) and (111) sites for thin films prepared −0.35 V vs SCE. For comparison, the values of a disoriented sample are also presented.

Figure 16:
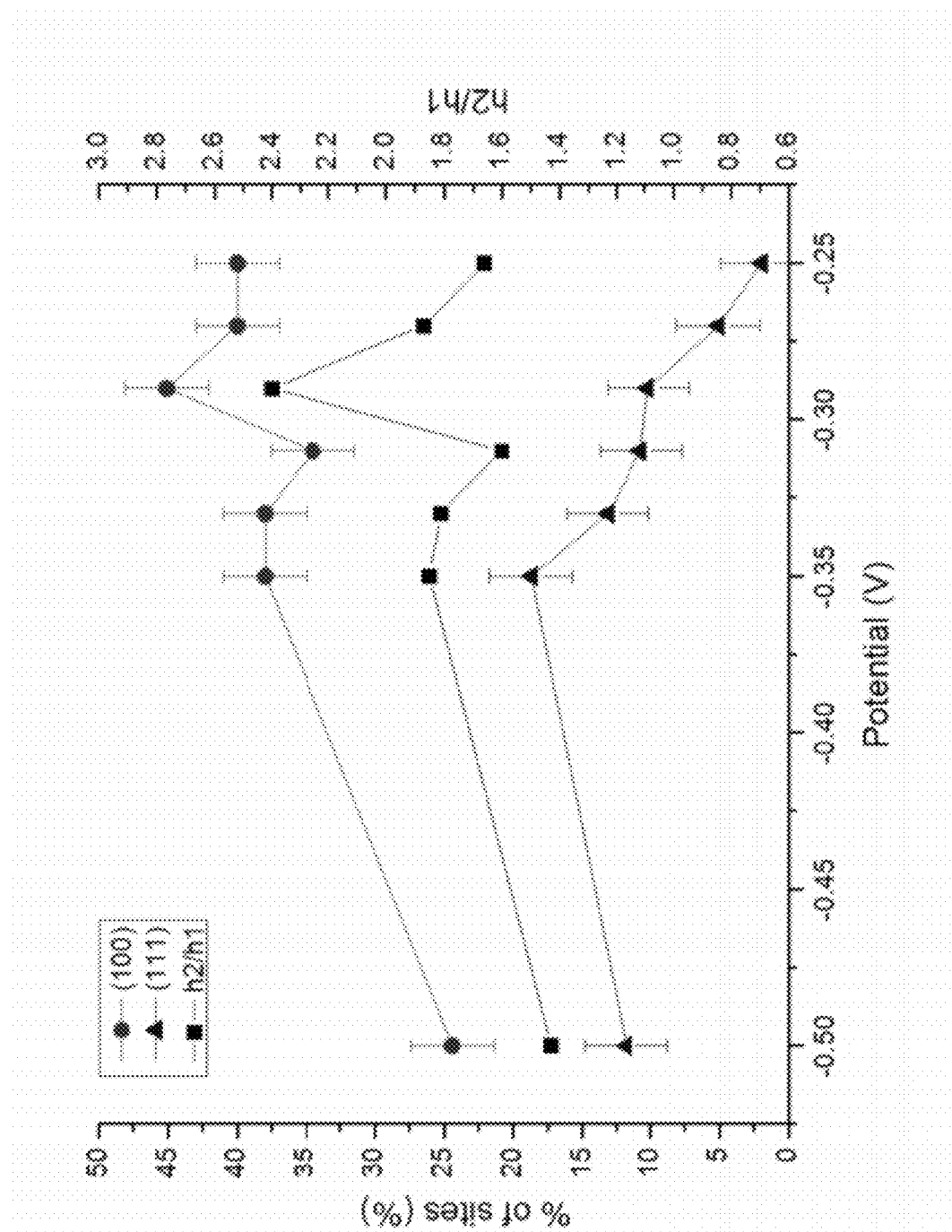
FIG. 16 shows the relationship between the fraction of (111) and (100) sites and the deposition potential (V vs SCE). The h$_2$/h$_1$ ratio is shown for comparison.

FIG. 16 shows the relationship between the fraction of (111) and (100) sites and the deposition potential (V vs SCE). The $h_2/h_1$ ratio is shown for comparison.

Figure 17:
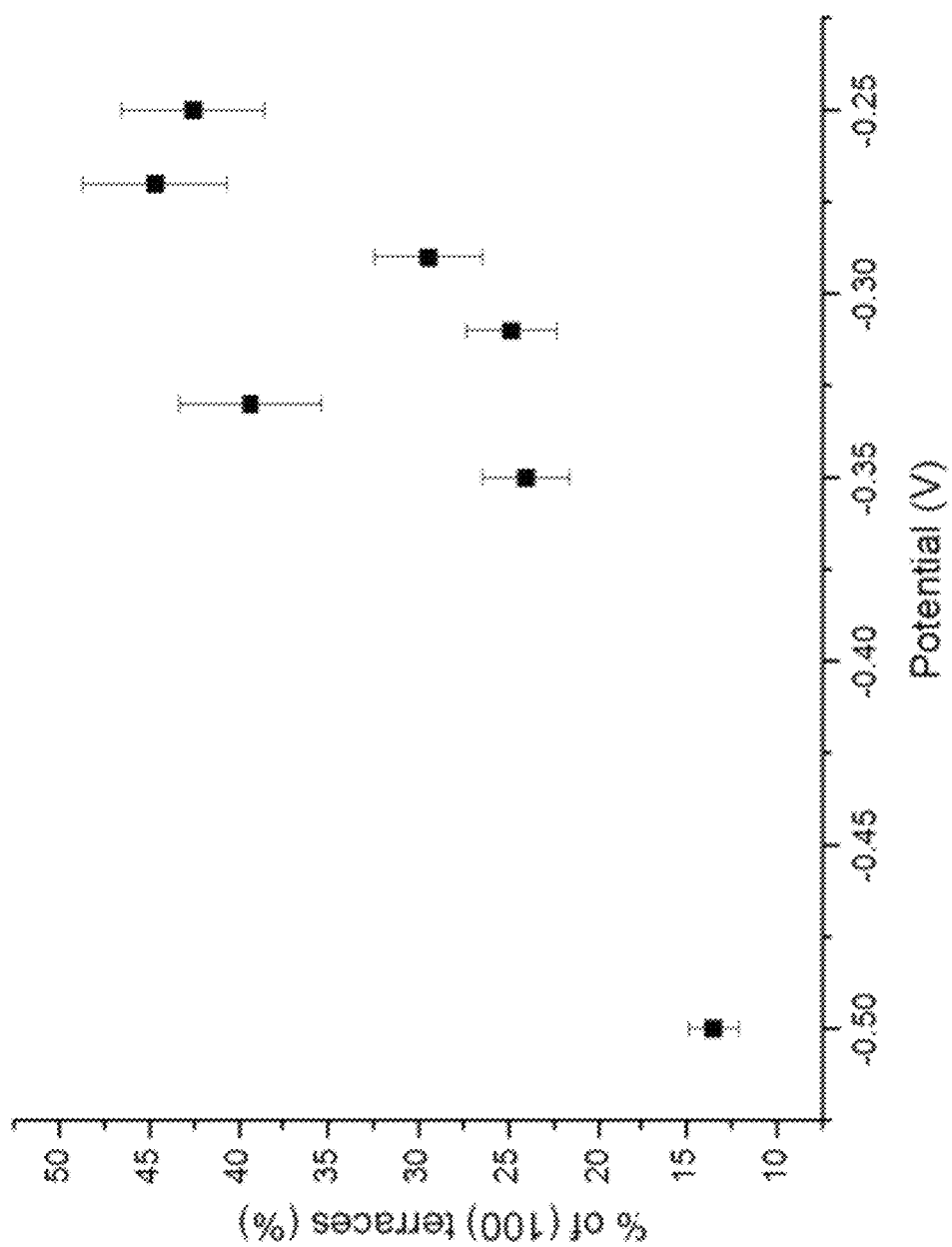
FIG. 17 shows the fraction of the (100) terraces (compared with the total number of (100) sites) on the samples prepared in function of the deposition potential (V vs SCE)

FIG. 17 shows the fraction of the (100) terraces (compared with the total number of (100) sites) on the samples prepared in function of the deposition potential (V vs SCE).

Then, analysis was done to study how Pt(100) surfaces could be used for catalysis of reactions, such as oxidation of hydrazine in an acidified medium and oxidation of ammonia in NaOH, already studied as described hereinabove, and others.

Figure 18:
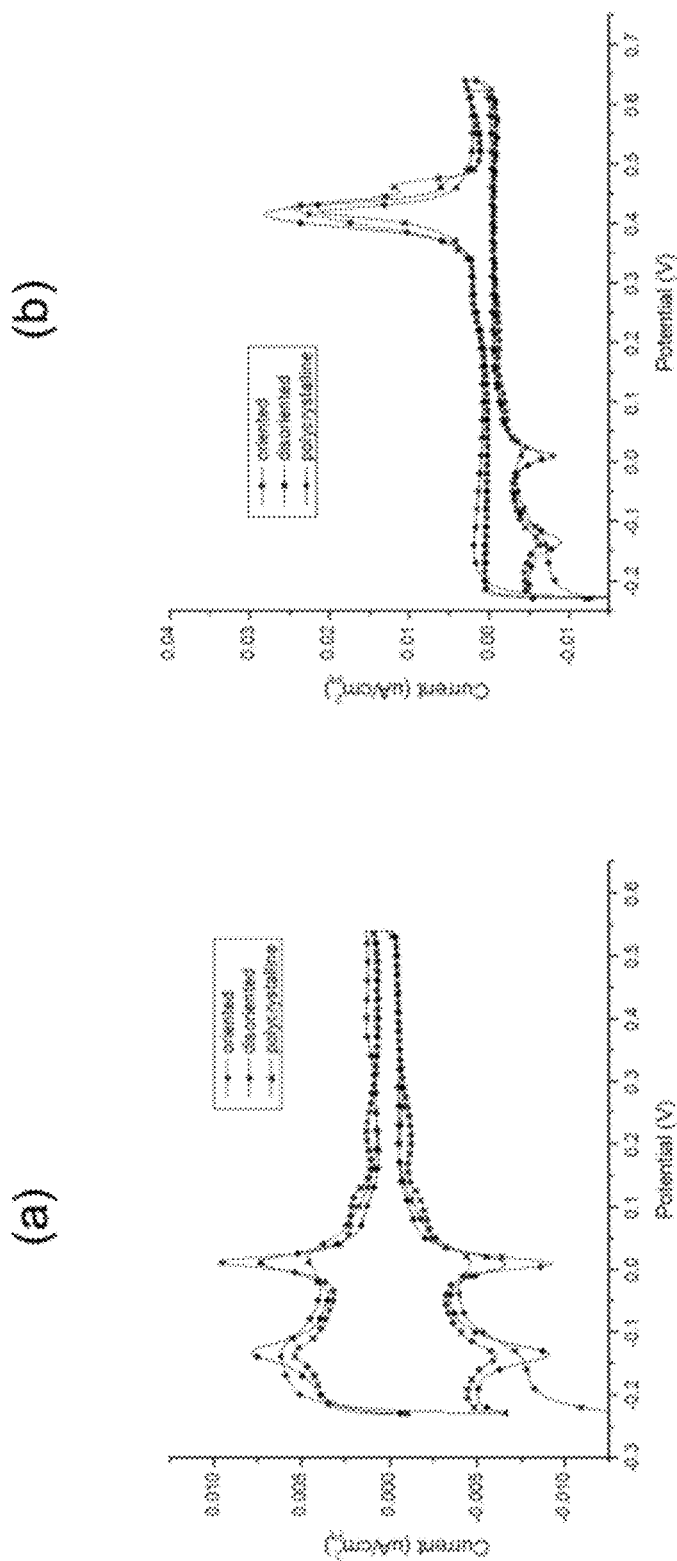
FIG. 18 shows the blank CVs a) and the CO stripping curves b) for an oriented sample (2 C/cm$^2$, squares), a disoriented sample (circles) and polycrystalline sample (triangles) CVs at 5 mV/s; at 0.43 V, the peak of the (111) and the (100) domains, at 0.46 V the peak associated with the (100) domains.

Carbon monoxide (CO) may be used as a sensor of Pt{100} presence. FIG. 18 shows CO stripping curve for an oriented sample (2 C/cm²), a disoriented sample and a polycrystalline sample CV at 5 mV/s, at 0.43 V, the peak of the (111) and the (110) domains, at 0.46 V the peak associated with the (100) domains.

Figure 19:
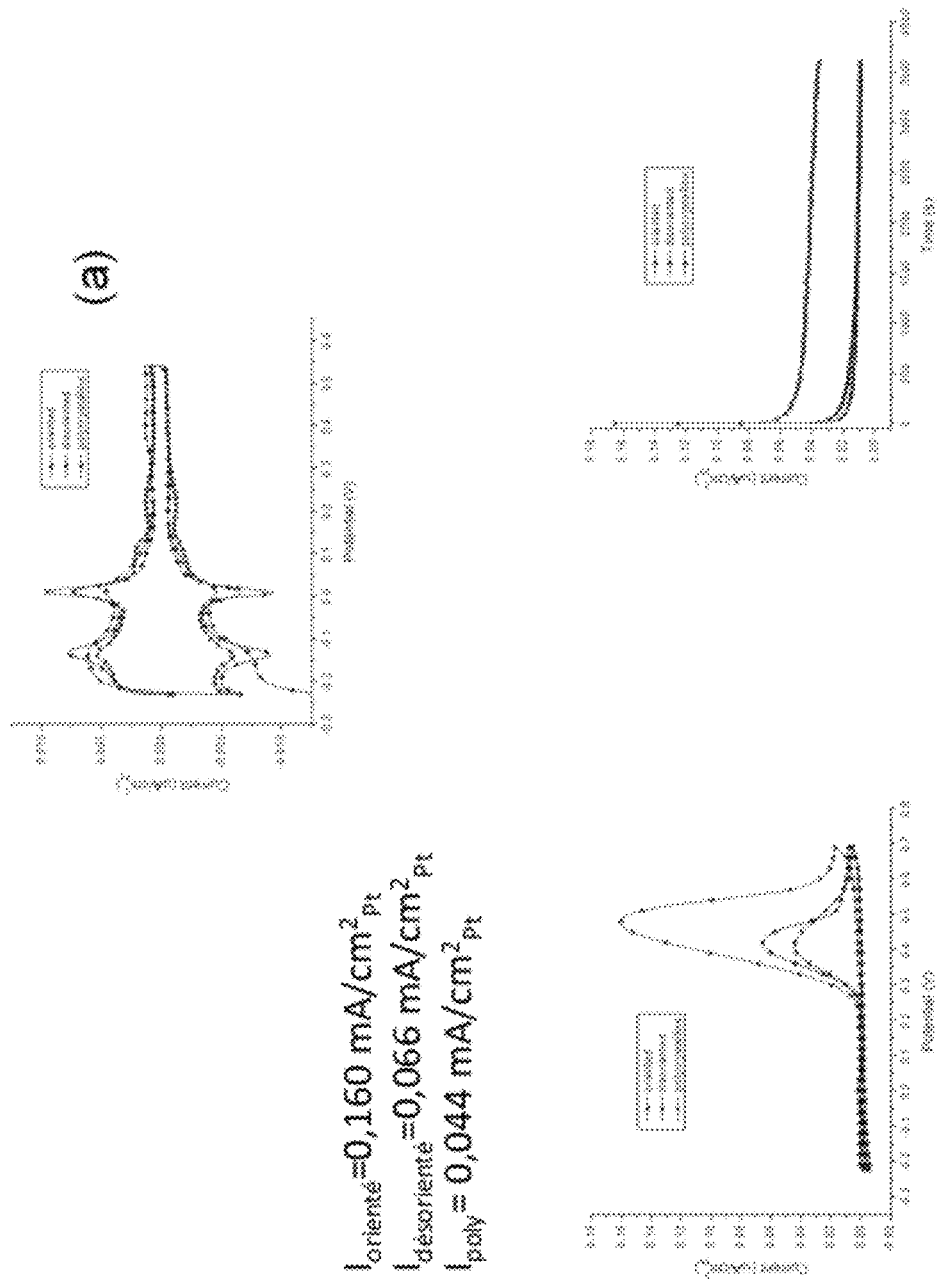
FIG. 19 show the blank CVs a) of an oriented sample (2 C/cm$^2$, squares), a disoriented sample (circles) and polycrystalline sample (triangles) at 5 mV/s, b) CVs of NH$_3$ oxidation at 1 mV/s and c) CA at 0.34 V vs SCE of NH$_3$ oxidation in NaOH 0.2 M+NH$_3$ 0.1 M.
Figure 20:
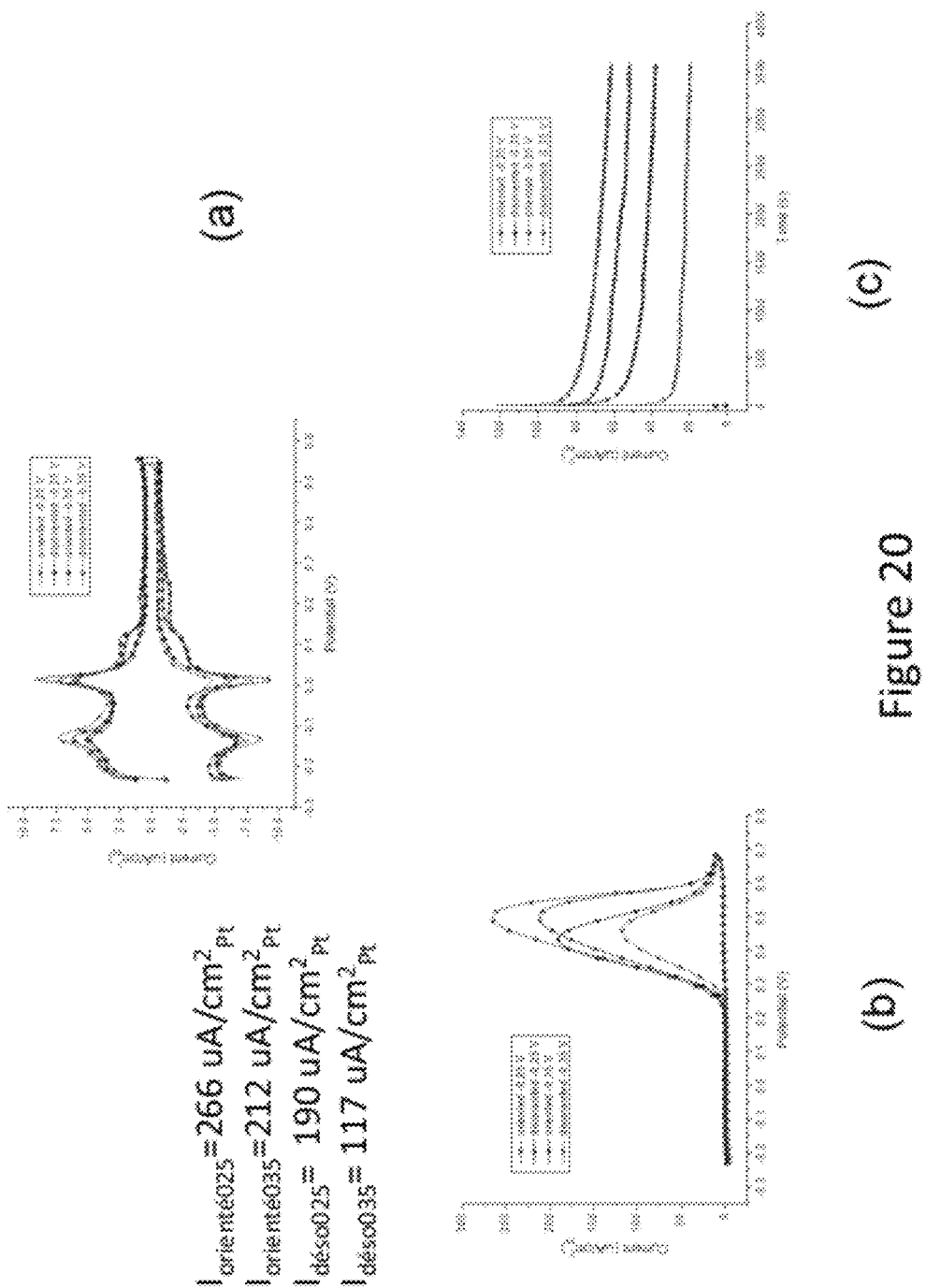
FIG. 20 shows a) the blank CVs of two oriented samples (30 cm$^2$ Pt) (and respective disoriented samples, triangles) with 38-40% of (100) sites, of which 42.5 (at −0.25 V, squares) and 24.0% (at −0.35 V, circles) are (100) terraces, with b) CVs at 1 mV/s of NH$_3$ oxidation and c) CA at 0.34 V vs SCE in NaOH 0.2 M+NH$_3$ 0.1 M.

FIG. 19 shows $NH_3$ oxidation on an oriented sample (2 C/cm²), a disoriented sample and a polycrystalline sample, with CVs at 1 mV/s and CA at 0.34 V vs SCE in NaOH 0.2 M+$NH_3$ 0.1 M. FIG. 20 shows $NH_3$ oxidation on two oriented samples (30 cm² Pt) (and respective disoriented samples) with 38-40% of (100) sites, of which 42.5 (at −0.25 V) and 24.0% (at −0.35 V) are (100) terraces, with CVs at 1 mV/s and CA at 0.34 V vs SCE in NaOH 0.2 M+$NH_3$ 0.1 M. Interests of Pt{100} for oxidation of ammonia in NaOH already mentioned hereinabove is clearly demonstrated.

Figure 21:
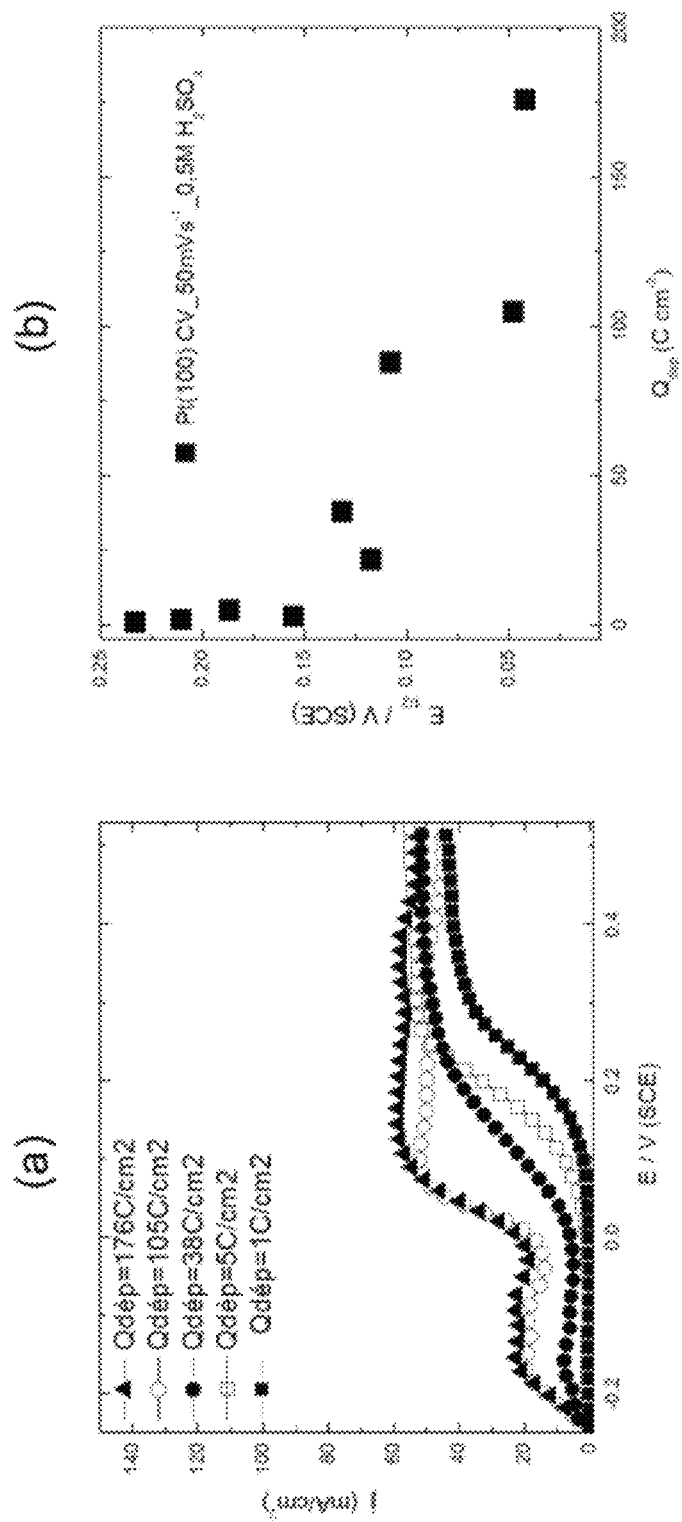
FIG. 21 shows voltammograms (50 mV s$^{-1}$) for preferentially oriented (100) Pt electrode in 50 mM N$_2$H$_4$+0.5M HClO$_4$ (filled symbols) and in presence of additional 0.5M Na$_2$SO$_4$ (open symbols), the insert highlights the beneficial shift towards low potential values (E/V) with increasing (100) surface sites.
Figure 22:
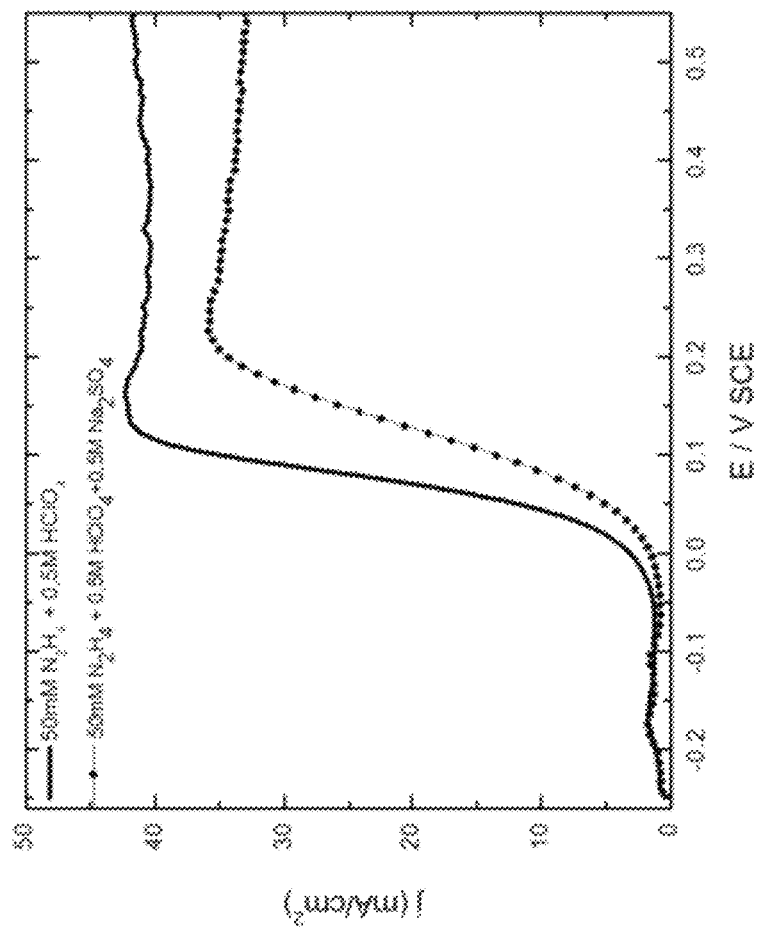
FIG. 22 shows voltammograms (50 mV s$^{-1}$) for preferentially oriented (100) Pt electrode in 50 mM N$_2$H$_4$+0.5M HClO$_4$ (black curve) and in additional presence of 0.5M Na$_2$SO$_4$ (points)
Figure 23:
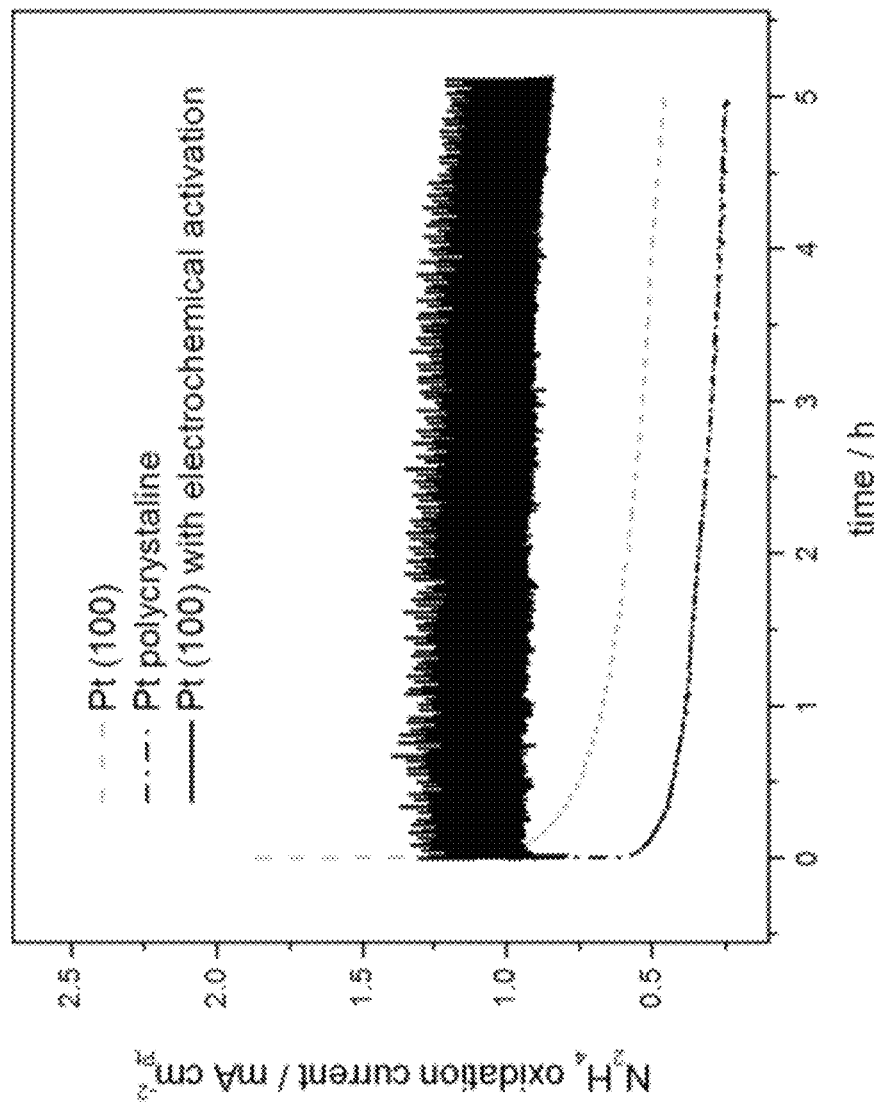
FIG. 23 shows current under potentiostatic conditions (E=0.2V vs SCE) in 0.5M $H_2SO_4$+100 mM $N_2H_4$ for platinum conventional polycrystalline and preferentially oriented Pt(100) films.

For oxidation of hydrazine ($N_2H_4$) in acidified medium, the interest of Pt{100} is also clearly demonstrated. FIG. 21 shows voltammograms (50 mV s⁻¹) for oriented (100) Pt in 50 mM $N_2H_4$+0.5M $H_2SO_4$, the Inset highlighting the beneficial shift towards low potential values (E/V) with increasing (100) surface sites. FIG. 22 shows an additional beneficial aspect by working in $HClO_4$ electrolyte. This behavior highlights the beneficial shift towards low potential values in $HClO_4$ supporting electrolyte as compared to sulphate containing solutions. As shown in FIG. 23, higher currents are generated at Pt(100) as compared to Pt polycrystalline (×2). Electrochemical activation can maintain the initial activity at (100) Pt films (90% initial current).

Figure 24:
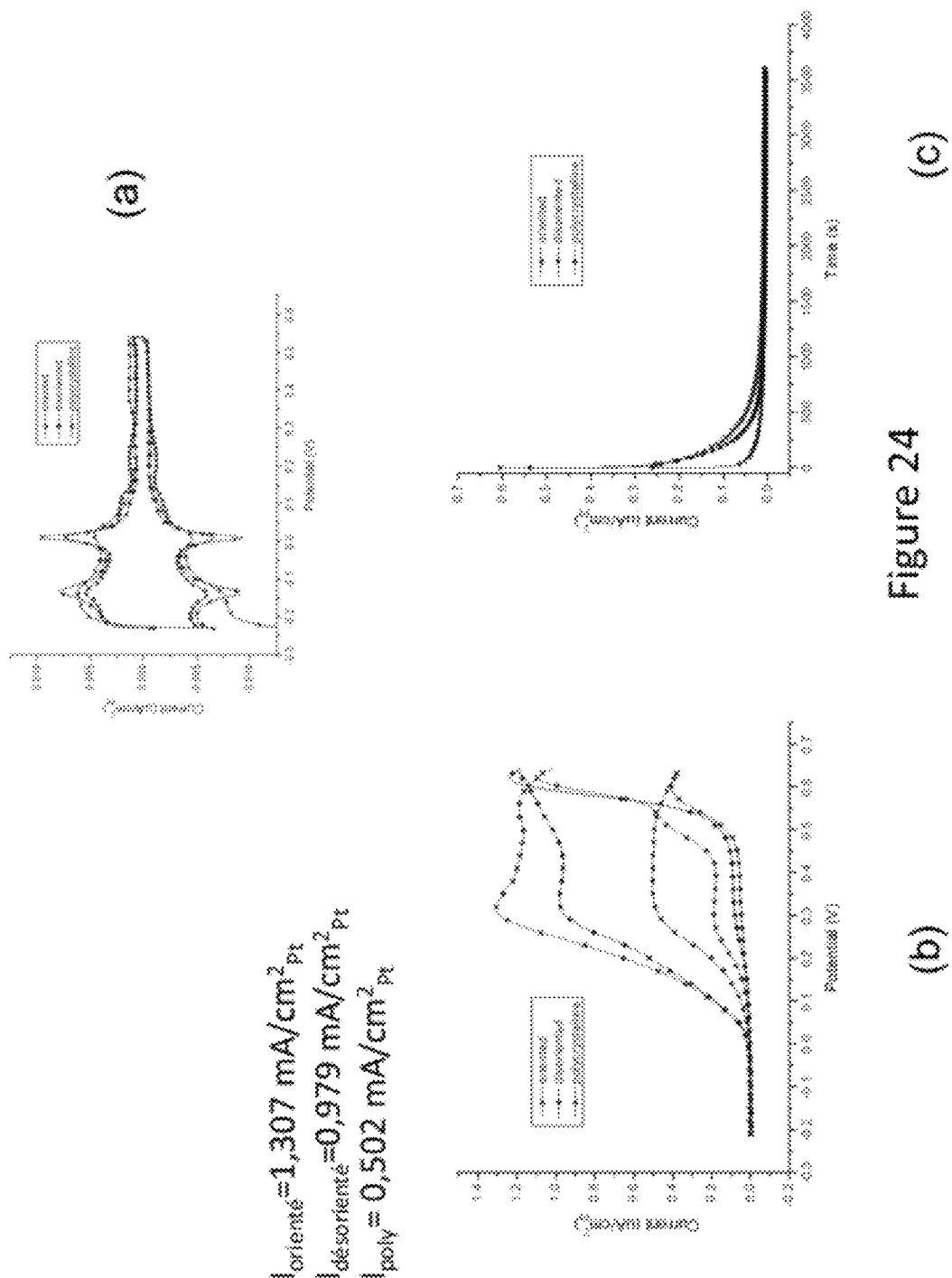
FIG. 24 show a) the blank CVs at 5 mV/s in $H_2SO_4$ 0.5 M on an oriented sample (2 C/cm$^2$, squares), a disoriented sample (circles) and polycrystalline sample (triangles), b) CVs of HCOOH oxidation at 5 mV/s and c) CA at 0.14 V in HCOOH 0.5 M+$H_2SO_4$ 0.5 M.

For oxidation of formic acid (HCOOH) in an acidified medium, results show that Pt(100) surface is more active, but quickly poisons itself (see FIG. 24).

Figure 25:
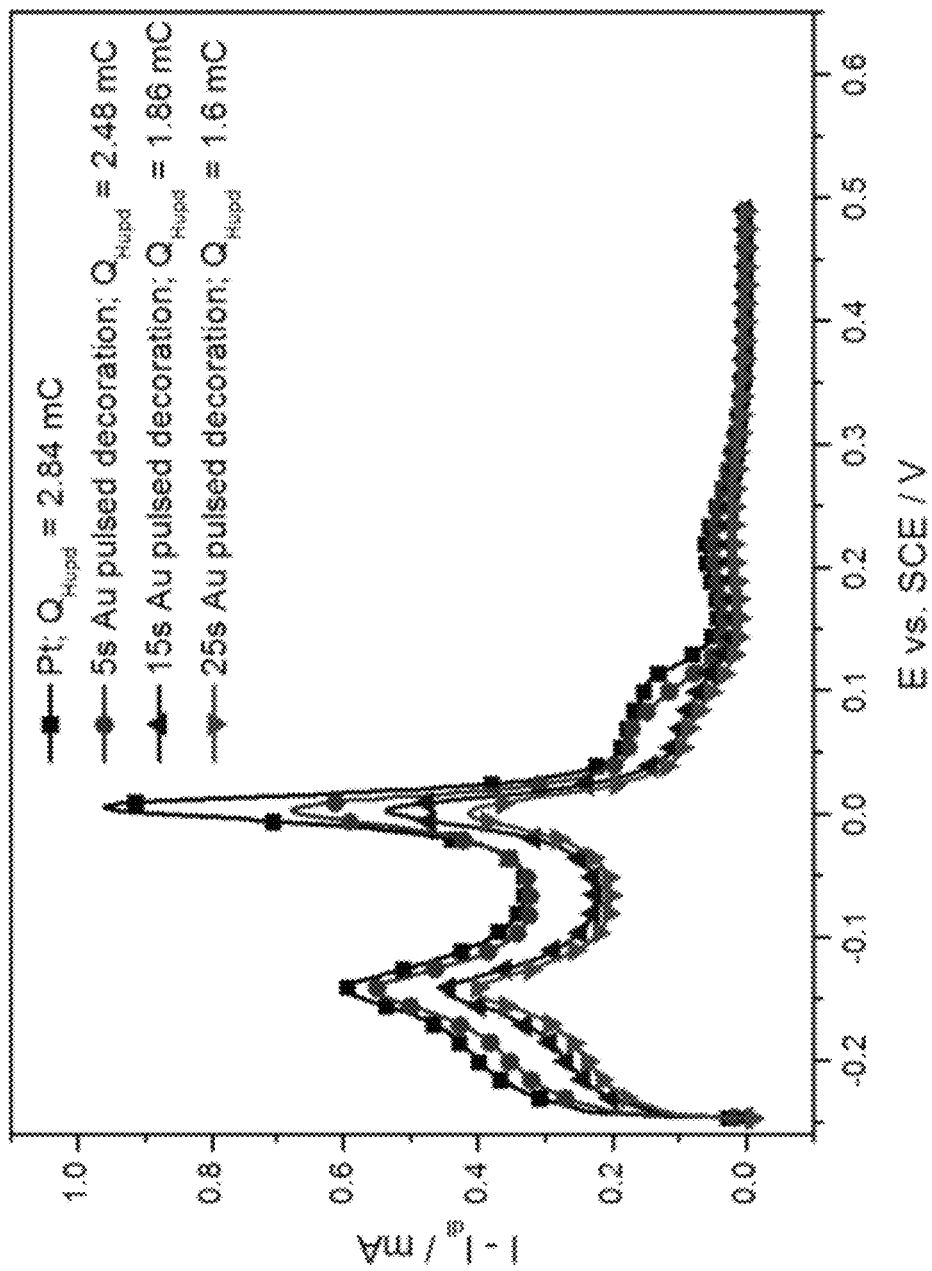
FIG. 25 shows evaluation of the Pt surface by integration of the $H_{upd}$ charge.
Figure 26:
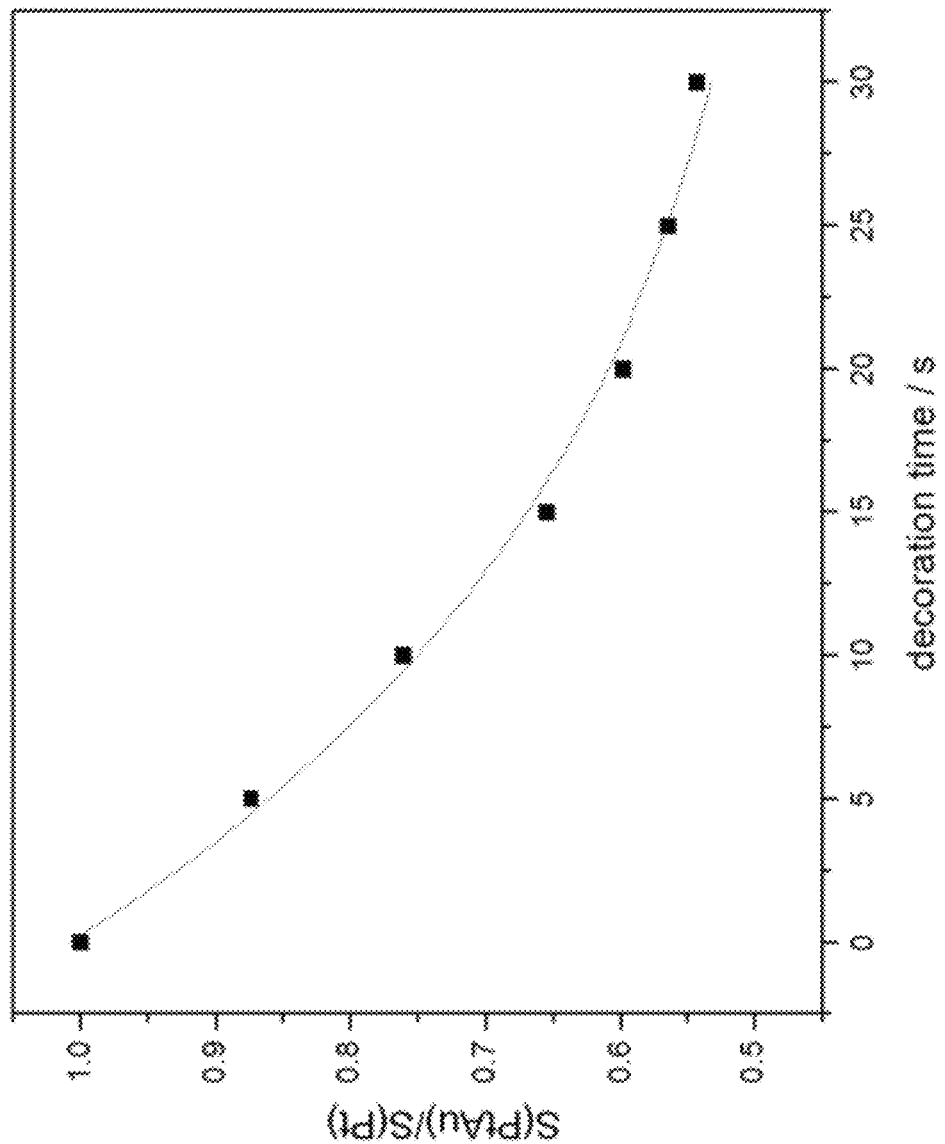
FIG. 26 shows the evolution of Au coverage of Pt with the deposition time, the coverage rate being evaluated from loads of FIG. 25.
Figure 27:
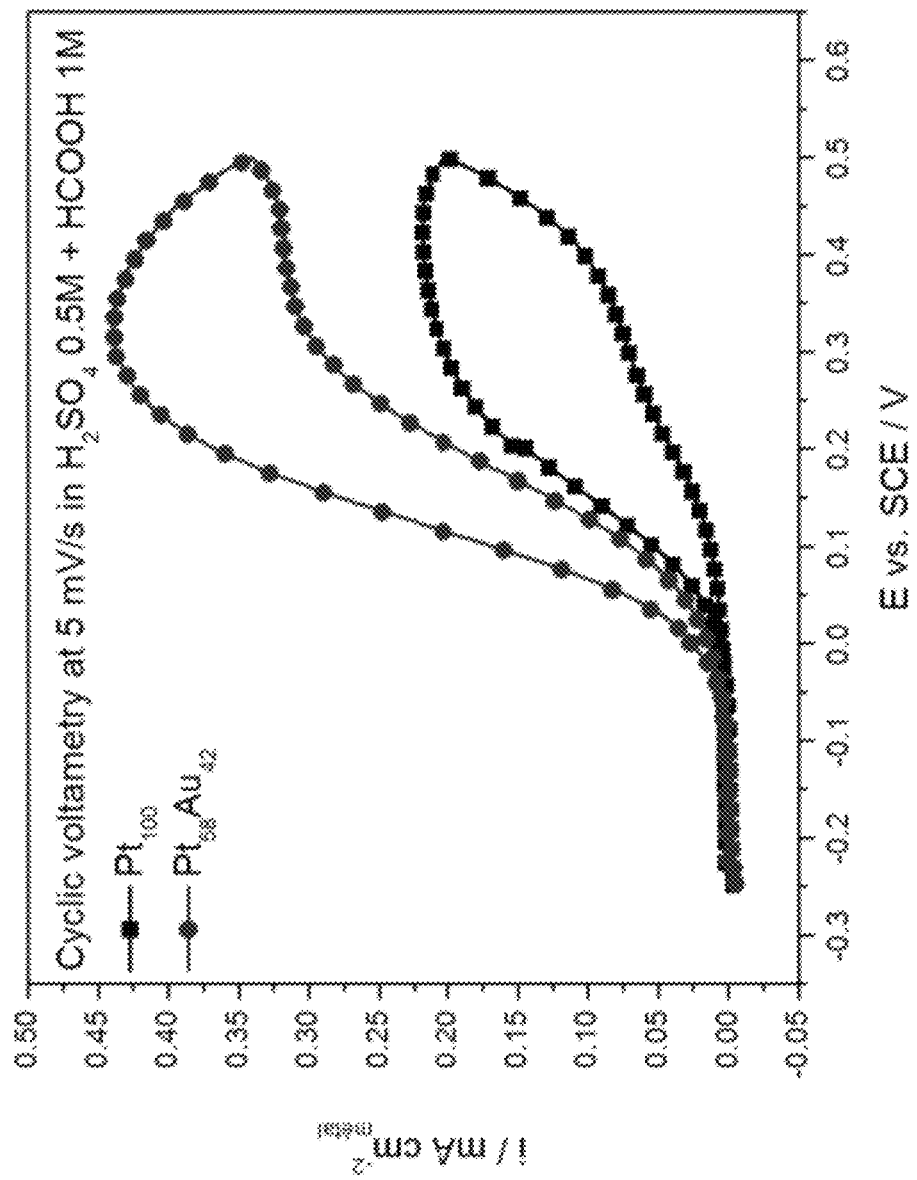
FIG. 27 shows cyclic voltammograms (5 mV/s) for Pt(100) and for Pt(100) decorated with 42% Au.
Figure 28:
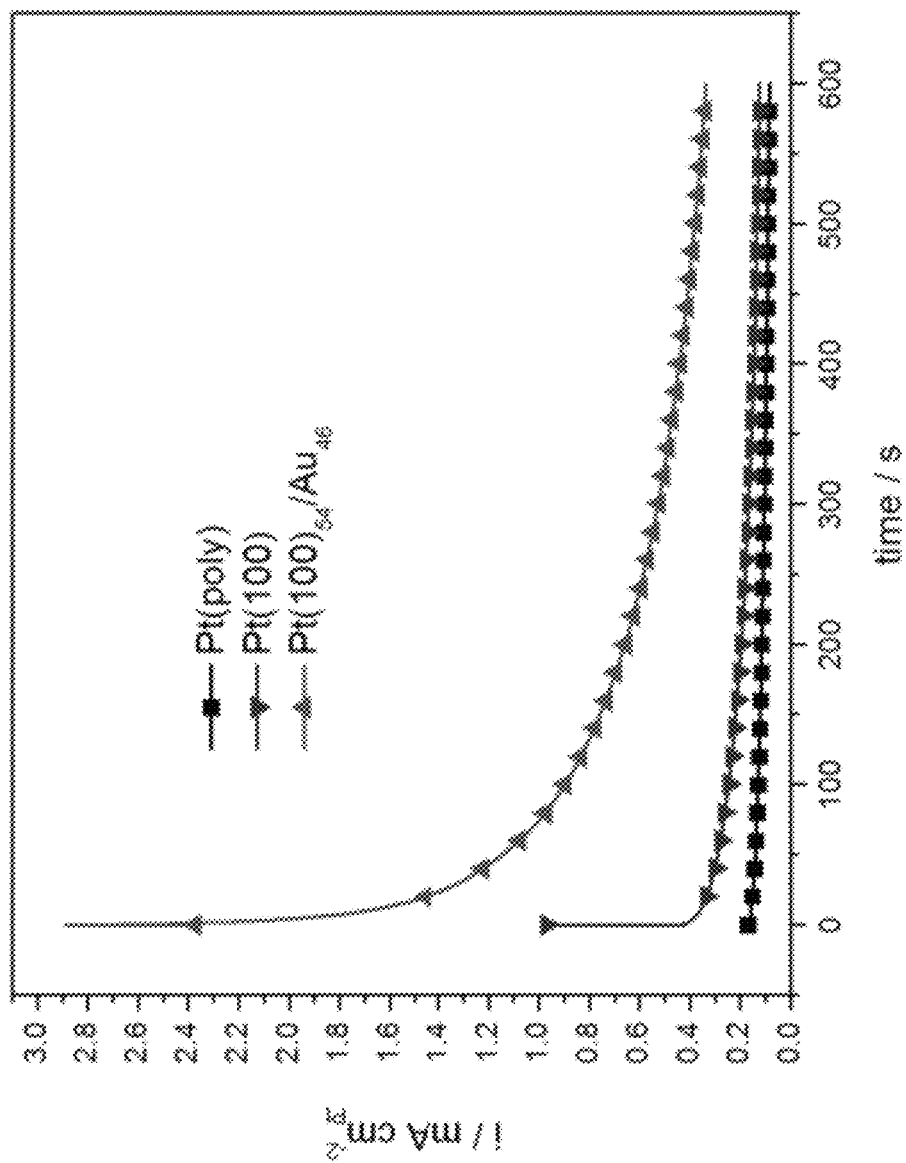
FIG. 28 shows the current density by cm$^2$ of Pt during a chronoamperometry (CA) at +0.2V vs. SCE, in $H_2SO_4$ 0.5M+HCOOH 1M, for polycrystalline Pt, Pt(100) and Pt(100) decorated with 50% Au.
Figure 29:
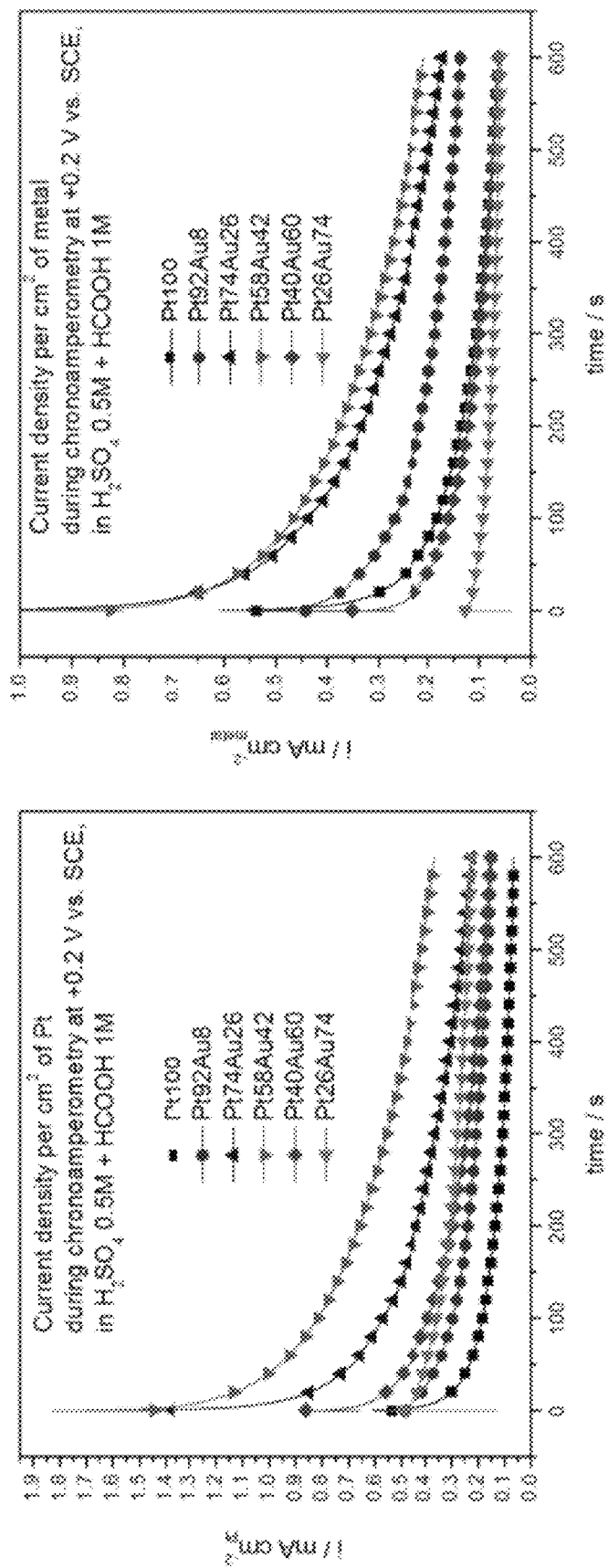
FIG. 29 shows (a) the current density per cm$^2$ of Pt during a chronoamperometry at +0.2V vs. SCE, in $H_2SO_4$ 0.5M+HCOOH 1 M; (b) the current density per cm$^2$ of metal during a chronoamperometry at +0.2V vs. SCE, in $H_2SO_4$ 0.5M+HCOOH 1 M.
Figure 30:
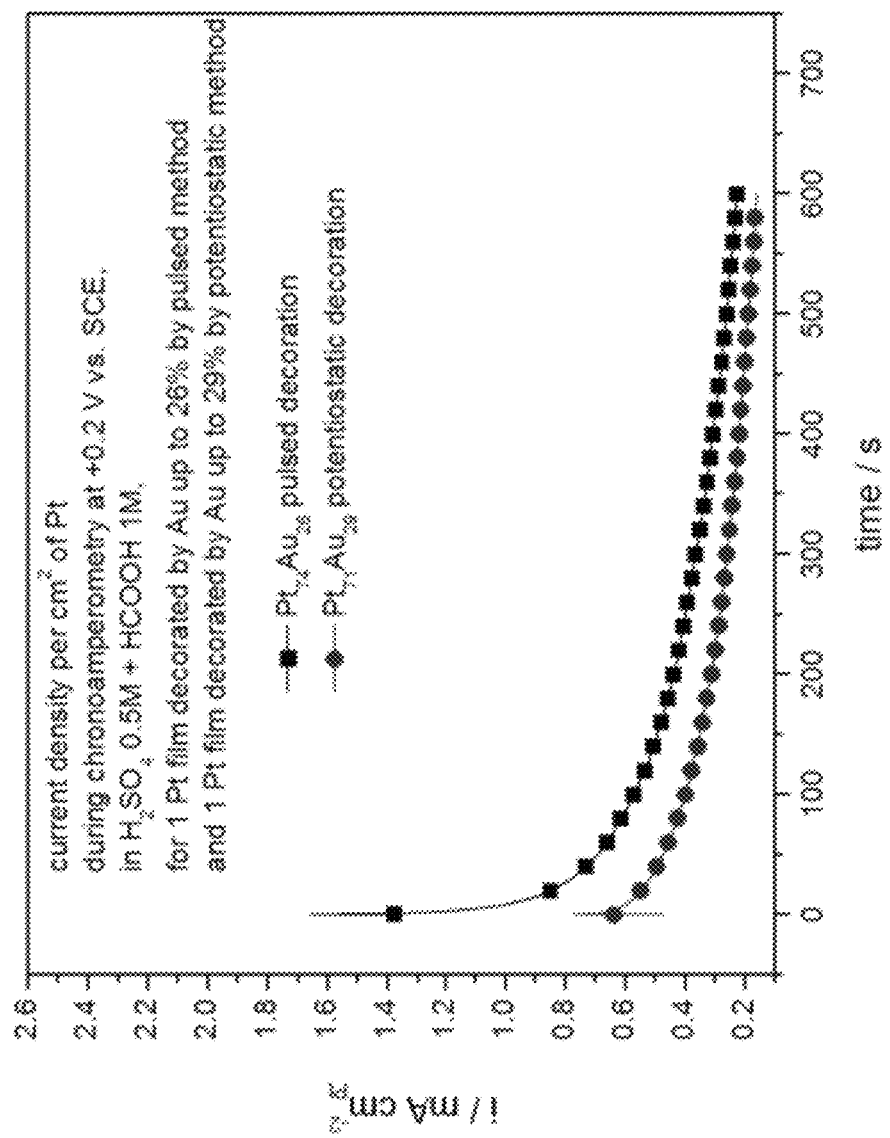
FIG. 30 shows the current density per cm$^2$ of Pt during a chronoamperometry at +0.2V vs. SCE, in $H_2SO_4$ 0.5M+HCOOH 1 M, for a film of Pt decorated at 26% by pulses method and for a film of Pt decorated at 29% by potentiostatic method.

Experiments were made to study modifications to the Pt(100) surface in order to make it less sensible to poisoning by oxygenated species that form, in particular, during oxidation of formic acid. A Pt(100) surface was modified by adding thereon gold nanoparticles by electrodeposition in a solution of $HAuCl_4$, with potential pulses of 0.5 V vs. SCE during 5 ms, 0.1 V vs. SCE during 5 ms, repeated as many times as necessary. The Pt surface was evaluated by integration of the $H_{upd}$ charge. A decrease of the $H_{upd}$ charge indicates a larger coverage of Pt by Au, and the preferential orientation is maintained, as shown in FIGS. 25 and 26. As shown in FIG. 27, decoration of Pt with Au allows improving the performances of the Pt(100) surface for oxidation of HCOOH. FIG. 28 shows the current density in cm² of Pt during a chronoamperometry (CA) at 0.2V vs. SCE, in $H_2SO_4$ 0.5 M+HCOOH 1M, for polycrystalline Pt, Pt(100) and Pt(100) covered with Au at 50%. In FIG. 29, the coverage rates are varied so as to compare the performances of the Pt(100) surface for oxidation of HCOOH. As shown in FIG. 30, if a constant potential is used to decorate the Pt(100) with gold, instead of a pulsed potential, the HCOOH oxidation current is less efficient for a same coverage of Pt by Au. Thus it was shown that the Pt(100) surface may be formed in a first step and then modified subsequently through the deposition of a second or series of elements by either electrochemical method (underpotential deposition, electrochemical deposition, etc) or any other deposition methods.

Thus, a method according to an embodiment of the present invention comprises potentiostatic electrodeposition of Pt on a substrate using acidified platinum solutions, in presence or in absence of KCl or any halides, with a deposition potential $E_{dep}$ lower than $E_{RHE}$+150 mV, where $E_{RHE}$ is the reversible hydrogen potential, for example a deposition potential $E_{dep}$ of about −0.15 V vs SCE ($E_{RHE}$+150 mV, considering $E_{SCE}$=−0.30V+$E_{RHE}$) or of about −0.35 V vs SCE ($E_{RHE}$−50 mV, considering $E_{SCE}$=−0.30V+$E_{RHE}$), a Pt salt concentration less than 5.0 mmole L$^{-1}$, for example less than 0.5 mmole L$^{-1}$, for example less than 0.25 mmole L$^{-1}$, a deposition bath temperature less than 70° C., for example less than 25° C. Deposition in a confined volume, using a nanoporous membrane, allows increasing the orientation effect. However, oriented deposits are obtained in absence of porous membrane, on smooth substrates. A range of substrates may be used, including for example Ti substrate and carbon cloth substrate. Retrieving the substrate from the bath once the deposit is done is found to prevent further deposition of non oriented Pt.

An aqueous electrolyte or an electrolyte showing a non-negligible solubility for Pt salt may be used, such as for example a ionic liquid or an organic solvent with high dielectric constant. Pt{100} may be formed as a result of deposition from a solution than contains only a Pt salt or a mixture of Pt salt with other metal salt. The Pt{100} surface may be formed in a first step and then subsequently modified through the deposition of a second or series of elements by either an electrochemical method (underpotential deposition, electrochemical deposition, etc) or other deposition methods known in the art.

This invention is not restricted to the formation of Pt{100} as electrodeposition of other elements or mixture of elements in presence of H$_2$ could also lead to the formation of preferentially oriented surface (that could differ from the {100} surface described herein).

As people in the art will now be in a position to appreciate, highly {100} oriented Pt deposits were prepared by electrodeposition from a 10 mM HCl, 100 mM KCl and Na$_2$PtCl$_6$.xH$_2$O electrolyte. The deposits were prepared in the form of thin films and array of nanowires. A qualitative assessment of the proportion of {100} oriented Pt surfaces was obtained through X-ray diffraction measurements and cyclic voltammetry in 0.5 M H$_2$SO$_4$. The effect of the deposition potential, $E_{dep}$, temperature of the electrolyte, $T_{dep}$, platinum salt concentration [Na$_2$PtCl$_6$.xH$_2$O], and nature of the substrate were investigated. It was shown that the proportion of {100} oriented Pt surfaces reaches a maximum for $E_{dep}$=−0.35V vs SCE. Moreover, this proportion increases steadily as $T_{dep}$ and [Na$_2$PtCl$_6$.xH$_2$O] are decreased from 75 to 25° C. and from 2.5 to 0.25 mM, respectively. Scanning electron microscopy and high-resolution transmission electron microscopy micrographs indicate that the more oriented samples are made of pine tree-like structures that are effectively single crystals, and that the growth facets appear to be close to the {001} plane. This observation also clearly indicates that the plane exposed during the CV experiment is also {001}. As suggested by these micrographs, the films and nanowires are highly porous and roughness factors as large as 1000 were obtained on highly {100} oriented Pt nanowires. The predominance of {100} facets is attributed to their energetically favored growth in the presence of hydrogen, and is shown to be significantly enhanced when the mass transport of Pt$^{4+}$ is limited. Due to the predominance of {100} facets, the normalized electrocatalytic activity (μA cm$^{-2}_{Pt}$) for the electro-oxidation of hydrazine and ammonia is higher than non-oriented polycrystalline Pt by a factor of 4 and 2.7, respectively.

It was shown that porous (roughness factors $R_f$ of several hundreds, typically in a range between about 8 and about 420 for thin films and of about 50 and about 700 for nanowires. In the case of nanowires, higher $R_f$ values may be obtained on larger nanowires) and highly-oriented {100} Pt thin films and nanowires might be grown on the surface of Ti and carbon paper substrates (ratio I(200)/I(220) comprised in a range between about 1.7 and about 2.2; ratio h$_2$/h$_1$ of the deposits comprised in a range between about 0.85 and about 2.2. Co oxydation peak at 0.72 V vs RHE). The occurrence of {100} facets on the surface of the deposit is dependent on the presence of hydrogen during the electrodeposition of Pt.

It is hypothesized that the surface free energy of {100}Pt in the presence of H$_2$ is lower than {111}$_{Pt}$ surfaces. In these conditions, the growth of predominantly exposed {100} Pt planes is expected. The interfacial kinetics of Pt attachment on {100} surface are low, and highly-oriented Pt thin films and nanowires are obtained only by reducing the deposition rate of Pt, which is achieved by lowering the Na$_2$PtCl$_6$ salt concentration and the temperature of the electrolyte. The mechanisms responsible for the deposition of {100} oriented Pt surface is not dependent on the nature of the substrate and highly oriented Pt thin films could be prepared on dense Ti and porous carbon substrates. Due to the predominance of {100} facets, electrodes made of highly-oriented Pt surfaces exhibit improved electrocatalytic activity for the oxidation of hydrazine (in acidified electrolyte) and ammonia (in alkaline electrolyte). This is consistent with the well-established fact that the electro-oxidation of small nitrogen hydride molecules such as hydrazine and ammonia is structure-sensitive, with the {100} planes being the most active.

The present method and system may find application in a number of technologies. The present Pt(100) may be used as gas sensing elements for, most particularly but not restricted to, the detection of NH$_3$ for example. The present Pt(100) may be used as new electrode material for polymer electrolyte membrane fuel cell, including but not restricted to direct formic acid fuel cell and direct hydrazine fuel cell for example. The present Pt(100) may be used for molecular detection, catalysis and the transformation of biomass, gas reforming, and magnetism applications for example.

Although the present invention has been described hereinabove by way of specific embodiments thereof, it can be modified, without departing from the nature and teachings of the subject invention as defined in the appended claims.

REFERENCES

N. V. Rees, R. G. Compton, *Energy Environ. Sci.* 2011, 4, 1255.

C. Nishihara, I. A. Raspini, H. Kondoh, H. Shindo, M. Kaise, H. Nozoye, *J. Electroanal. Chem.* 1992, 338, 299.

R. Gomez, J. M. Orts, A. Rodes, J. M. Feliu, A. Aldaz, *J. Electroanal. Chem.* 1993, 358, 287.

B. Alvarez-Ruiz, R. Gomez, J. M. Orts, J. M. Feliu, *J. Electrochem. Soc.* 2002, 149, D35.

V. Rosca, M. T. M. Koper, *Electrochim. Acta* 2008, 53, 5199.

F. J. Vidal-Iglesias, N. Garcia-Araez, V. Montiel, J. M. Feliu, A. Aldaz, *Electrochem. Commun.* 2003, 5, 22.

F. J. Vidal-Iglesias, J. Solla-Gullon, V. Montiel, J. M. Feliu, A. Aldaz, *J. Phys. Chem. B* 2005, 109, 12914.

V. Rosca, M. T. M. Koper, *Phys. Chem. Chem. Phys.* 2006, 8, 2513.

R. M. Cervino, W. E. Triaca, A. J. Arvia, *J. Electroanal. Chem.* 1985, 182, 51.

J. Gomez, L. Vazquez, A. M. Baro, N. Garcia, C. L. Perdriel, W. E. Triaca, A. J. Arvia, *Nature* 1986, 323, 612.

W. E. Triaca, A. J. Arvia, *J. Appl. Electrochem.* 1990, 20, 347.

F. J. Vidal-Iglesias, J. Solla-Gullon, V. Montiel, J. M. Feliu, A. Aldaz, *J. Power Sources* 2007, 171, 448.

T. S. Ahmadi, Z. L. Wang, T. C. Green, A. Hengleina, M. A. El-Sayed, *Science* 1996, 272, 1924.

T. S. Ahmadi, Z. L. Wang, A. Henglein, M. A. El-Sayed, *Chem. Mater.* 1996, 8, 1161.

S. Brimaud, S. Pronier, C. Coutanceau, J. M. Leger, *Electrochem. Commun.* 2008, 10, 1703.

P. Urchaga, S. Baranton, T. W. Napporn, C. Coutanceau, *Electrocatalysis* 2010, 1, 3.

P. Rodriguez, E. Herrero, J. Solla-Gullon, F. J. Vidal-Iglesias, A. Aldaz, J. M. Feliu, *Electrochim. Acta* 2005, 50, 4308.

J. Solla-Gullon, P. Rodriguez, E. Herrero, A. Aldaz, J. M. Feliu, *Phys. Chem. Chem. Phys.* 2008, 10, 1359.

J. Solla-Gullon, V. Montiel, A. Aldaz, J. Clavilier, *J. Electroanal. Chem.* 2000, 491, 69.

L. Y. Zhao, A. C. Siu, L. J. Pariag, Z. H. He and K. T. Leung, *J. Phys. Chem Lett.,* 2007, 111, 14621-14624.

N. Tian, Z. Y. Zhou, N. F. Yu, L. Y. Wang, S. G. Sun, *J. Am. Chem. Soc.* 2010, 132, 7580.

S. Garbarino, A. Ponrouch, S. Pronovost, J. Gaudet, D. Guay, *Electrochem. Commun.* 2009, 11, 1924.

P. L. Taberna, S. Mitra, P. Poizot, P. Simon, J. M. Tarascon, *Nature Mater.* 2006, 5, 567

A. Ponrouch, M. P. Bichat, S. Garbarino, C. Maunders, G. Botton, P. L. Taberna, P. Simon, D. Guay, *ECS Transactions* 2010, 25, 3

A. Ponrouch, S. Garbarino, S. Pronovost, P. L. Taberna, P. Simon, D. Guay, *J. Electrochem. Soc.* 2010, 157, K59

The invention claimed is:

1. A method for preparation of highly porous {100} oriented platinum thin films on a substrate by electrodeposition in a deposition bath in absence of a porous membrane, comprising using a deposition potential $E_{dep}$ lower than $E_{RHE}$+150 mV and an acidified platinum salt solution having a Pt salt concentration less than 5.0 mmole $L^{-1}$.

2. The method of claim 1, wherein the deposition potential $E_{dep}$ is about $E_{RHE}$+150 mV.

3. The method of claim 1, wherein the deposition potential $E_{dep}$ is about $E_{RHE}$-50 mV.

4. The method of claim 1, wherein the platinum salt concentration is less than 0.5 mmole $L^{-1}$.

5. The method of claim 1, wherein the platinum salt concentration is less than 0.25 mmole $L^{-1}$.

6. The method of claim 1, wherein the temperature of the deposition bath is less than 70° C.

7. The method of claim 1, wherein the temperature of the deposition bath is less than 25° C.

8. The method of claim 1, wherein the substrate is one of Ti or carbon substrates.

9. The method of claim 1, wherein the substrate is one a cloth substrate or a plate.

10. The method of claim 1, comprising retrieving the substrate from the deposition bath after the deposition period.

11. The method of claim 1, using KCl as supporting electrolyte.

12. The method of claim 1, using an halide as supporting electrolyte.

13. The method of claim 1, wherein the ratio between the maximum peak intensity of the X-ray diffraction peaks of the crystallographic plane (200) and the crystallographic plane (220), I(200)/I(220), of the thin films is comprised in a range between about 1.7 and about 2.2.

14. The method of claim 1, wherein the peak current ratio $h_2/h_1$ of the thin film is comprised in a range between about 0.85 and about 2.2, where $h_1$ and $h_2$ are anodic peaks related to hydrogen desorption from (110) sites and (100) sites respectively, as determined from cyclic voltammetric curves at 5 mVs$^{-1}$.

15. The method of claim 1, wherein the thin films comprise Pt{100} in a range between about 20 and about 60% of the surface sites of the thin films.

16. The method of claim 1, wherein the roughness factor of the thin films ranges from about 8 to about 420.

17. The method of claim 1, further comprising modifying the surface of the thin films by deposition of at least a second element.

18. The method of claim 1, further comprising modifying the surface of the thin films by deposition of gold.

19. The method of claim 1, wherein the substrate is one of a dense or porous substrate.

20. A method for preparation of highly porous {100} oriented platinum thin films on a substrate by electrodeposition in presence of hydrogen and in absence of a porous membrane, comprising limiting the concentration of Pt salts in the electrolyte to less than 5.0 mmole $L^{-1}$ and controlling the temperature of the electrolyte.

21. The method of claim 20, comprising controlling the temperature of the electrolyte to less than 70° C.

22. The method of claim 20, comprising controlling the temperature of the electrolyte to less than 25° C.

23. The method of claim 20, comprising limiting the concentration of Pt salts in the electrolyte to less than 0.5 mmole $L^{-1}$.

24. The method of claim 20, comprising limiting the concentration of Pt salts in the electrolyte to less than 0.25 mmole $L^{-1}$.

* * * * *